United States Patent

Naito et al.

[11] Patent Number: 5,952,564
[45] Date of Patent: Sep. 14, 1999

[54] ANTI-LOCK BRAKE CONTROL SYSTEM FOR MOTOR VEHICLE WITH FACILITY FOR DISCRIMINATING VIBRATIONS OF DRIVING WHEELS THEREOF

[75] Inventors: Yasuo Naito; Chiaki Fujimoto; Mitsuhiro Mimura, all of Tokyo, Japan

[73] Assignee: Mitsubishi Denki Kabushiki Kaisha, Tokyo, Japan

[21] Appl. No.: 08/858,543

[22] Filed: May 19, 1997

[30] Foreign Application Priority Data

May 17, 1996 [JP] Japan ................................. 8-123542

[51] Int. Cl.⁶ .................................................. G01M 19/00
[52] U.S. Cl. ............................................................ 73/118.1
[58] Field of Search ..................... 73/105, 118.1; 364/426.01, 426.015, 426.016, 426.017, 426.021, 426.023, 426.024

[56] References Cited

U.S. PATENT DOCUMENTS 5,620,390  4/1997  Kono et al. .

FOREIGN PATENT DOCUMENTS 6-32222   2/1994   Japan .
7-257347  10/1995  Japan .

*Primary Examiner*—Robert Raevis
*Attorney, Agent, or Firm*—Sughrue, Mion, Zinn, Macpeak & Seas, PLLC

[57] ABSTRACT

An anti-lock brake control system for motor vehicle which can determine vibrations of wheel speed brought about by rough-road condition and judder phenomenon by detecting a torque applied to a driving shaft of the motor vehicle in association with driving wheels without need for estimating a coefficient of friction of a road surface, to thereby improve and enhance the performance of the anti-lock brake control for the motor vehicle. Whether vibration of the driving wheel is brought about by a judder phenomenon or by a rough-road condition is decided on the basis of predetermined relations between the vibration state of the driving wheel and that of the torsion torque applied to the driving shaft.

5 Claims, 13 Drawing Sheets

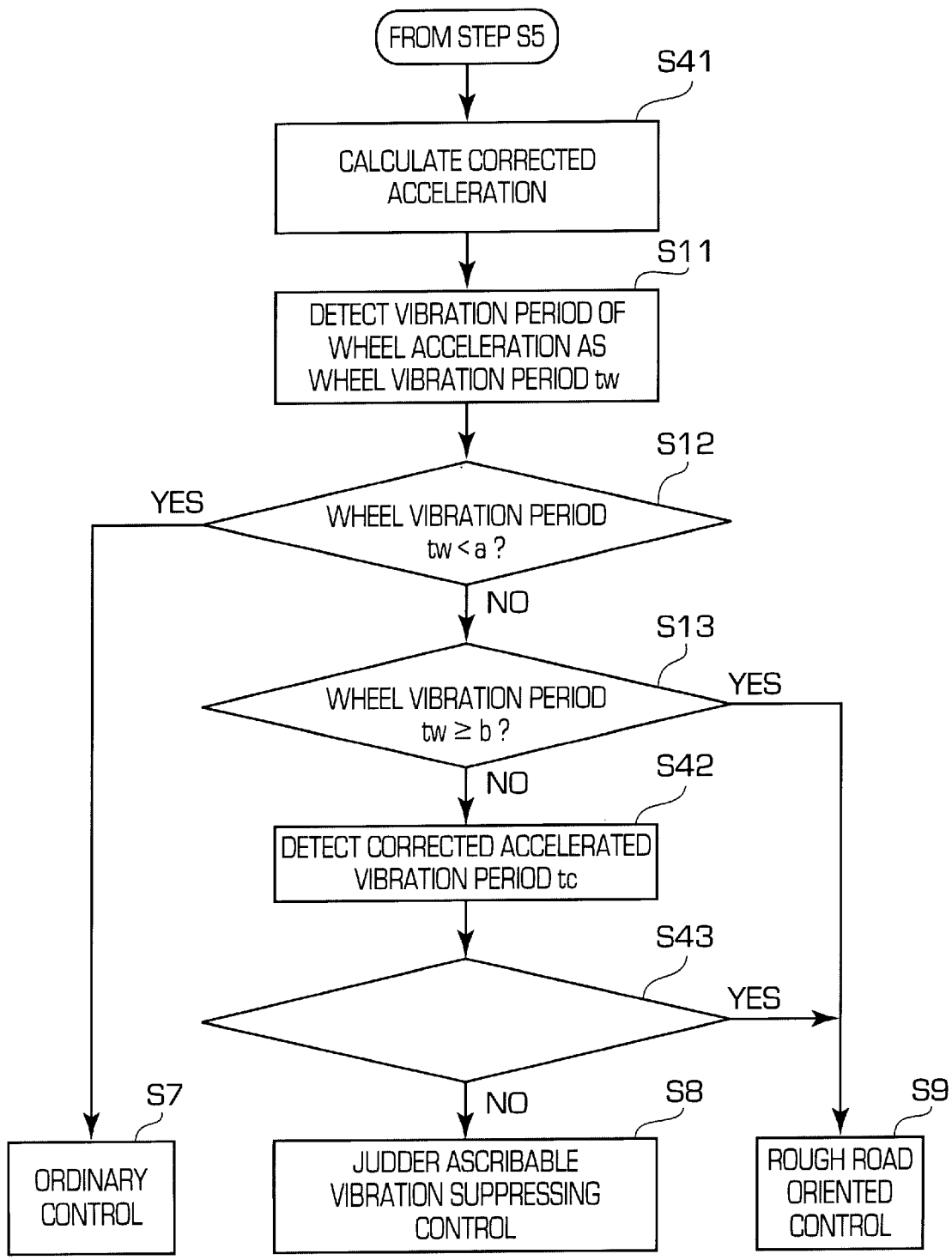

ANTI-LOCK BRAKE CONTROL SYSTEM FOR MOTOR VEHICLE WITH FACILITY FOR DISCRIMINATING VIBRATIONS OF DRIVING WHEELS THEREOF

BACKGROUND OF THE INVENTION

1. Field of the Invention

The present invention relates generally to an anti-lock brake control system for a motor vehicle. In more particular, the invention is concerned with the anti-lock brake control system which is capable of performing an anti-lock brake control while taking into consideration discriminatively the vibrations in the velocity or speed of the wheels of the motor vehicle which take place when the motor vehicle is running on a rough road of an irregular or wavy road surface on one hand and the vibration of the wheel speed referred to as the judder which is brought about due to variation in the torque transmitted between a driving system inclusive of an internal combustion engine (hereinafter also referred to simply as the engine) and the driving wheels of the vehicle on the other hand. Further, the invention is concerned with a method of detecting discriminatively whether vibration of the driving wheel of a motor vehicle is brought about by what is known as a judder phenomenon or by a rough-road condition.

2. Description of Related Art

In general, in the anti-lock brake control system for the motor vehicle, the trend of wheels being locked is detected on the basis of the result of comparison between the wheel speed (given, for example, by rotation number of the wheel per minute or rpm) and an estimated velocity or speed of the motor vehicle or on the basis of deceleration of the wheel or the like, wherein braking hydraulic pressure applied to the wheel is adjusted or regulated so that magnitude of skid of the wheel relative to the road surface is maintained at a value close to a region in which the friction between the wheel and the road surface assumes a peak value, with a view to shortening the stopping distance of the motor vehicle, ensuring stability of the vehicle body and enhancing the manipulatability or driving performance of the motor vehicle. By way of example, in the conventional anti-lock brake control system known heretofore, decision is made to the effect that the wheel of the motor vehicle tends to be locked when behavior of the wheel such as a slip thereof which represents a sink of the wheel speed relative to the estimated vehicle speed attains a predetermined threshold value, whereupon a control for lowering the braking hydraulic pressure applied to the wheel is carried out.

In this conjunction, it is noted that when a motor vehicle is running on a so-called rough road having a irregular or wavy road surface, the wheel speed is caused to vibrate due to the roughness of the road surface. In that case, the braking hydraulic pressure may be lowered as a result of the anti-lock brake control, because the trend of the wheel being locked may be decided on the basis of the wheel vibration possibly detected as the slip of the wheel on the basis of the acceleration/deceleration of the wheel, as mentioned above. However, it will readily be appreciated that in that case, the anti-lock brake control for lowering the braking hydraulic pressure is intrinsically unnecessary because the wheel vibration does not indicate the wheel-lock trend or tendency but it is brought about by the roughness of the road surface. Thus, when the anti-lock brake control system performs the braking hydraulic pressure lowering control in response to the detection of the wheel vibration brought about by the rough-road condition, there may arise such situation that the anti-skid braking force applied to the wheel becomes insufficient. Under the circumstances mentioned above, such measures are adopted that when the roughness of the road (i.e., bad road) on which the motor vehicle is running is detected, the criterion of the decision for validating the braking hydraulic pressure lowering control is made more severe or the criterion of the decision for increasing the braking hydraulic pressure is altered to be less severe, in an effort to suppress the anti-lock brake control in response to the wheel vibration occurring when the motor vehicle is running on a bad or rough road.

Next, let's consider the judder phenomenon. When the braking hydraulic pressure is increased or decreased steeply, magnitude of the torque applied to the wheel varies significantly. Upon occurrence of such variation in the torque applied to the driving wheel of the motor vehicle, variation naturally takes place in the transmission of torque between the driving wheel and the engine which are operatively connected or coupled together via a drive shaft. In that case, because of a large inertia of the engine, the drive shaft coupling together the engine and the driving wheel is subjected to torsion. In particular, when the motor vehicle is running on a road having a road surface of a small coefficient of friction such as a frozen road surface, the drive shaft is likely to be applied with such torsion, which incurs vibration of the wheel. This phenomenon is what is referred to as the judder. In this conjunction, when the phenomenon of judder is erroneously identified as the vibration due to the rough-road condition to thereby set more severe the criterions for validating the lowering of the braking hydraulic pressure, there may arise such situation that the braking hydraulic pressure is not lowered for the driving wheel which has actually a tendency of being locked. Consequently, magnitude of the slip of the wheel increases, involving degradation in the stability as well as in the steering performance of the motor vehicle. On the other hand, when the criterions for validating the control for increasing the braking hydraulic pressure are set less severe, as mentioned previously, the judder will unwantedly be promoted because of the torque varies in synchronism with the vibration, to uncomfortableness of a drive of the motor vehicle.

As the measures for coping with the problems mentioned above, there have heretofore been proposed various approaches. By way of example, in Japanese Unexamined Patent Application Publication No. 32222/1994 (JP-A-6-32222), such an anti-lock brake control for a motor vehicle is disclosed according to which decision is made to the effect that wheel vibration is taking place when acceleration and deceleration of predetermined magnitude occurs a predetermined number of times within a predetermined time, wherein the wheel vibration is decided as being brought about by the judder when the frictional coefficient of the road surface is low.

Additionally, there is disclosed in Japanese Unexamined Patent Application Publication No. 257347/1995 (JP-A-7-257347) such an anti-lock brake control according to which when rapid restoration of the wheel speed of the driving wheel is detected and when the wheel speed of the non-driving wheel is restored within a predetermined time in succession to the detection of the rapid restoration of the wheel speed of the driving wheel, the criteria for validating the lowering of the braking hydraulic pressure are set severe. On the other hand, unless the wheel speed of the non-driving wheel is restored within the predetermined time in succession to the detection of the rapid restoration of the rotation speed of the driving wheel, it is then decided that the wheel vibration is ascribable to the judder phenomenon, and thus the criteria for lowering the braking hydraulic pressure are modified to be more lenient.

As is apparent from the above description, in the case of the anti-lock brake control system disclosed in JP-A-6-32222, it is certainly possible to discriminate whether the vibration of the driving wheel is bought about by the rough-road condition or ascribable to the judder phenomenon. However, the discriminative decision of the judder is made on the basis of the estimated coefficient of friction of the road surface. Accordingly, difficulty is encountered to decide discriminatively whether the vibration of the driving wheel is due to the rough-road condition or the judder phenomenon, when it is difficult to estimate the coefficient of friction of the road surface. In reality, estimation of the coefficient of friction of the road surface is difficult in the early phase of the anti-lock brake control because deceleration of the motor vehicle is not stable during such early period.

In the case of the anti-lock brake control system disclosed in JP-A-7-257347, the vibrations of both the driving wheel and the non-driving wheel are detected, wherein when the rotation speeds of both the driving wheel and the non-driving wheel are vibrating, it is then decided that the vibration of the wheels is ascribable to the rough-road condition whereas when only the speed of the driving wheel is vibrating, decision is made that the vibration is due to the judder phenomenon. Accordingly, with this anti-lock brake control system, it is impossible to discriminatively discern whether the wheel vibration is due to the rough-road condition or it is brought about by the judder phenomenon in e.g. a four-wheel driven motor vehicle whose wheels are all implemented as the driving wheels, giving rise to a problem.

SUMMARY OF THE INVENTION

In the light of the state of the art described above, it is a general object of the present invention to provide an anti-lock brake control system for a motor vehicle which is essentially or substantially immune to the problems of the conventional anti-lock brake control system such as pointed out.

In particular, it is an object of the present invention to provide an anti-lock brake control system which is capable of deciding or determining discriminatively the vibration of the wheel speed brought about by rough-road condition on one hand and the vibration of the wheel speed due to the judder on the other hand by detecting the torque applied to a drive shaft of the motor vehicle in association with only the driving wheels without need for estimating the coefficient of friction of a road surface, to thereby improve and enhance the performance of the anti-lock brake control for the motor vehicle.

It is another object of the present invention to provide a method of discriminatively determining whether vibration of the driving wheel of the motor/vehicle is due to the so-called judder phenomenon or brought about by a rough-road condition which method can be implemented in the form of a program executed by a microcomputer.

In view of the above and other objects which will become apparent as the description proceeds, there is provided according to an aspect of the present invention an anti-lock brake control system for a motor vehicle for applying brake to the motor vehicle in safety while avoiding occurrence of a wheel-locked state by repeating operation for lowering a braking hydraulic pressure when a wheel speed decreases upon braking to a level at which the wheel-locked state is likely to occur and increasing again the braking hydraulic pressure when the wheel speed is recovered as a result of the lowering of the braking hydraulic pressure, which system comprises a braking hydraulic pressure regulating means for regulating the braking hydraulic pressure transmitted to a braking member provided in association with each of wheels of the motor vehicle in accordance with a driving signal as given, a wheel speed detecting means for detecting a rotation speed of the wheel of the motor vehicle, a wheel vibration detecting means for detecting wheel vibration state on the basis of output of the wheel speed detecting means, a prime mover means for driving the motor vehicle, a torsion torque detecting means for detecting a torsion torque applied to a driving shaft serving as a torque transmitting member for coupling operatively the prime mover means and at least one driving wheel of the wheels to each other, a torsion torque vibration detecting means for detecting vibratory state of the torsion torque detected by the torsion torque detecting means, a rough-road/judder discriminating means for discriminatively deciding a judder indicative of vibration of the driving wheel due to torsion of the driving shaft on one hand and a vibration of the driving wheel occurring when the motor vehicle runs on a rough road on the other hand, a vibration suppressing control means for suppressing vibration of at least one of the driving wheels by regulating the braking hydraulic pressure through the medium of the braking hydraulic pressure regulating means in response to decision of occurrence of the judder made by the rough-road/judder discriminating means, and a rough-road control means for regulating the braking hydraulic pressure to suppress the lowering of the braking hydraulic pressure or alternatively promoting the increasing of the braking hydraulic pressure for at least one of the driving wheels in response to decision made by the rough-road/judder discriminating means that the wheel vibration is ascribable to the rough road.

In a preferred mode for carrying out the invention, the torsion torque vibration detecting means may include a torsion torque vibration period measuring means for measuring a torsion torque vibration period at which the torsion torque reaches a predetermined value. On the other hand, the wheel vibration detecting means may include a wheel acceleration arithmetic means for determining a wheel acceleration by determining a rate of change of the wheel speed and a wheel vibration period measuring means for measuring a wheel vibration period at which the wheel acceleration reaches a predetermined value. In that case, the rough-road/judder discriminating means may be so designed as to decide that the wheel vibration is brought about by the rough-road condition when the wheel vibration period is greater than a predetermined value inclusive and when difference between the wheel vibration period and the torsion torque vibration period is greater than a predetermined value inclusive, while deciding that the wheel vibration is due to judder when the wheel vibration period is smaller than the first mentioned predetermined value and when the difference between the wheel vibration period and the torsion torque vibration period is smaller than the second mentioned predetermined value.

In another preferred mode for carrying out the invention, the torsion torque vibration period measuring means may be so designed as to measure a time lapsed from a time point at which the wheel acceleration reached the predetermined value as detected by the wheel acceleration arithmetic means to a time point at which the torsion torque attains a predetermined value within a predetermined time period. In that case, the rough-road/judder discriminating means may be so designed as to decide that the wheel vibration is ascribable to rough-road condition when the time measured by the torsion torque vibration period measuring means is greater than a predetermined value inclusive, while deciding that the wheel vibration is due to judder when the time measured by the torsion torque vibration period measuring means is smaller than the predetermined value.

In yet another preferred mode for carrying out the invention, the wheel vibration detecting means may include a wheel acceleration arithmetic means for determining a wheel acceleration by determining a rate of change of the wheel speed, and a wheel vibration amplitude calculating means for arithmetically determining a maximum value or alternatively a minimum value of the wheel acceleration as a wheel vibration amplitude value representing the amplitude of the wheel vibration. In that case, the torsion torque vibration detecting means is comprised of a torsion torque vibration amplitude calculating means for arithmetically determining a maximum value or alternatively a minimum value of the torsion torque as a torque amplitude value representing the amplitude of the torque variation. Further, the rough-road/judder discriminating means may be so designed as to decide that the wheel vibration is ascribable to rough-road condition when a ratio between the wheel acceleration amplitude value and the torsion torque amplitude value is greater than a predetermined value inclusive while deciding that the wheel vibration is due to judder when the ratio between the wheel acceleration amplitude value and the torsion torque amplitude value is smaller than the predetermined value.

In a further preferred mode for carrying out the invention, the wheel vibration detecting means includes a wheel acceleration arithmetic means for determining a wheel acceleration by determining a rate of change of the wheel speed, a wheel vibration period measuring means for measuring a wheel vibration period at which the wheel acceleration reaches a predetermined value, a corrected acceleration arithmetic means for determining a corrected acceleration by correcting the wheel acceleration by adding thereto the torsion torque, and a corrected acceleration vibration period measuring means for measuring a period at which the corrected acceleration reaches the predetermined value. In that case, the rough-road/judder discriminating means may be so designed as to decide that the wheel vibration is due to a rough-road condition when the wheel vibration period is greater than a predetermined value inclusive and when the vibration period of the corrected acceleration is greater than a predetermined value inclusive, while deciding that the wheel vibration is ascribable to judder when the vibration period of the corrected acceleration is smaller than the predetermined value.

According to another general aspect of the present invention, there is also provided a method of determining discriminatively vibration of a driving wheel of a motor vehicle equipped with an engine and an anti-lock brake control system whether the vibration of the driving wheel is due to a judder phenomenon or brought about by rough-road condition, which method is comprised of the steps of detecting a rotation speed of the driving wheel, detecting wheel vibration state on the basis of variation in the rotation speed of the driving wheel, detecting a torsion torque applied to a driving shaft serving as a torque transmitting member for coupling operatively the engine and the driving wheel to each other, detecting vibration state of the torsion torque, and deciding discriminatively whether the vibration of the driving wheel as detected is brought about by the judder phenomenon or alternatively by the rough-road condition, on the basis of a relation between the wheel vibration state and the torsion torque vibration state.

With the method described above, it is contemplated that a microcomputer incorporating a memory in which the methods are stored as programs falls within the scope and spirit of the present invention.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the coarse of the description which follows, reference is made to the drawings, in which:

FIG. 13 is a flow chart for illustrating a flow of processings fo deciding discriminatively whether vibration of driving wheels is ascribable to judder or rough-road condition according to still another embodiment of the invention.

DESCRIPTION OF THE PREFERRED EMBODIMENTS

General Description

Figure 1A:
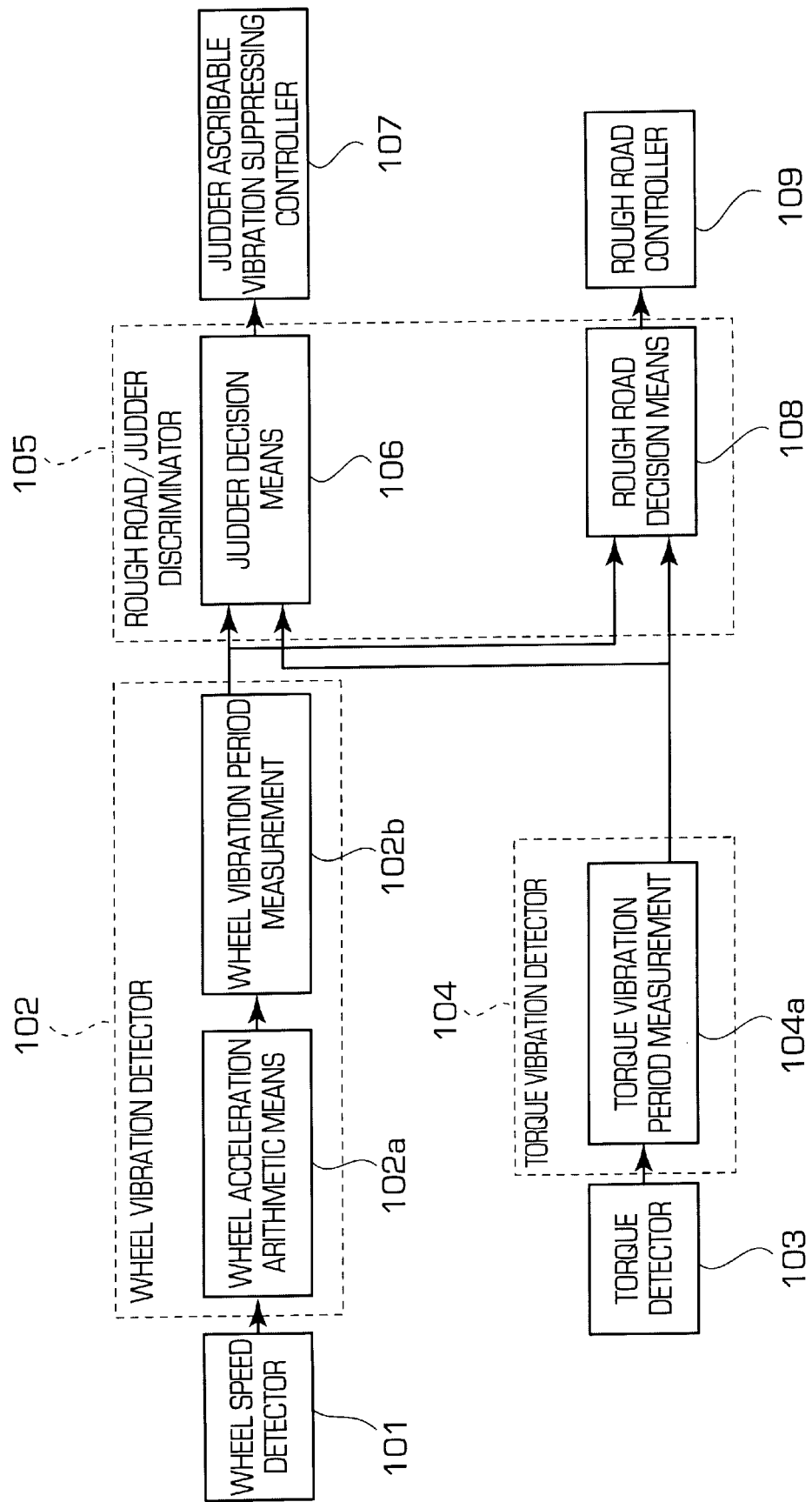
FIG. 1A is a functional block diagram for illustrating conceptually a first configuration of a anti-lock brake control system according to the present invention.
Figure 1B:
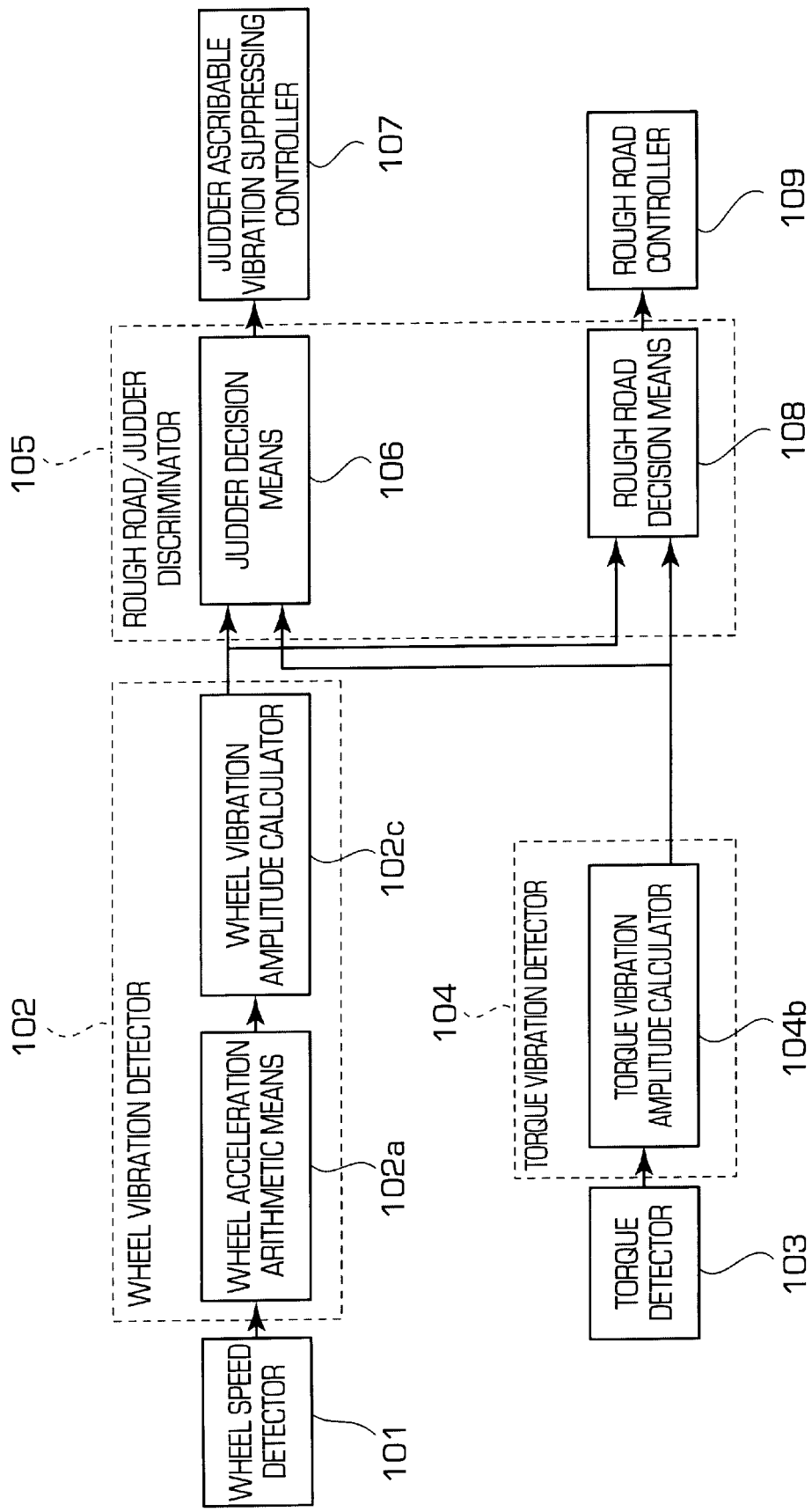
FIG. 1B is a functional block diagram for illustrating conceptually a second configuration of the anti-lock brake control system according to the invention.
Figure 2:
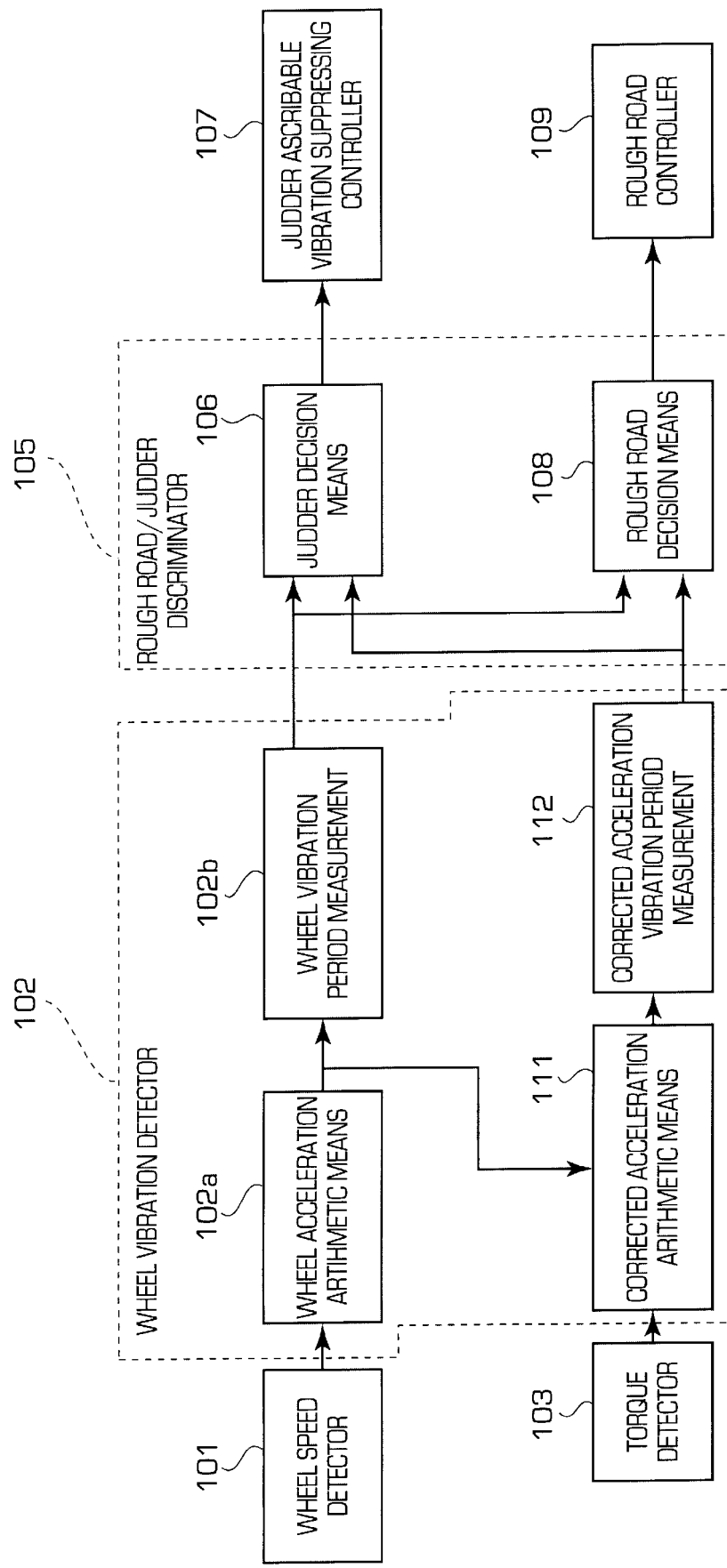
FIG. 2 is a functional block diagram for illustrating conceptually a third configuration of the anti-lock brake control system according to the invention.

Before entering into detailed description of exemplary or preferred embodiments of the anti-lock brake control system according to the present invention, the concept or principle underlying the invention will first be elucidated by referring to FIGS. 1A, 1B and FIG. 2.

In general, upon occurrence of a judder phenomenon, torsion is applied to a drive shaft interconnecting operatively an engine and driving wheels of a motor vehicle, as a result of which a torsion torque of the drive shaft acts on the driving wheels to give rise to generation of vibration thereof. In other words, the vibration of the driving wheel is brought about by the vibration of the torsion torque generated in the drive shaft. Accordingly, by detecting the vibrating states of the torsion torque and the driving wheel, decision can be made discriminatively whether or not the vibration of the driving wheel is brought about by the judder. On the other hand, unless the torsion torque of the drive shaft is not vibrating nevertheless of vibration of the wheel speed or unless the vibration mode of the torsion torque of the drive shaft coincides with that of the driving wheel, it can be decided that the vibration of the wheel speed is not brought about under the action of the torsion torque of the drive shaft but due to other cause, i.e., running of the motor vehicle on a rough road.

Accordingly, by determining the vibrating state or behavior of the driving wheel on the basis of the detected wheel speed while detecting the vibration of the torsion torque acting on the drive shaft, it can be decided that the vibration of the driving wheel is ascribable to the judder when the vibration behavior of the driving wheel coincides with that of the torsion torque of the drive shaft, and if otherwise, decision may be made to the effect that the vibration of the driving wheel is attributable to the rough-road condition. When it is decided that vibration of the driving wheel is ascribable to the judder, the vibration suppressing control is performed by prohibiting steep increase of the braking hydraulic pressure or modifying correspondingly the timing at which the braking hydraulic pressure is increased. On the other hand, when it is decided that the vibration of the driving wheel is due to the rough-road condition, the criteria for enabling reduction of the braking hydraulic pressure are altered to be more severe or alternatively control for preventing the braking hydraulic pressure from being lowered is effectuated to thereby facilitate increase of the braking hydraulic pressure.

Thus, according to a general aspect of the present invention, there is provided an anti-lock brake control system which is composed of a braking hydraulic pressure regulating means for regulating the braking hydraulic pressure transmitted to a braking member provided in association with each of wheels of the motor vehicle in accordance with a driving signal as given, a wheel speed detecting means 101 for detecting a rotation speed of the wheel of the motor vehicle, a wheel vibration detecting means 102 for detecting wheel vibration state on the basis of output of the wheel speed detecting means 101, a prime mover for driving the motor vehicle, which may be constituted by an engine and other, a torsion torque detecting means 103 for detecting a torsion torque applied to a driving shaft serving as a torque transmitting member for coupling operatively the prime mover and at least one driving wheel of the wheels of the motor vehicle to each other, a torsion torque vibration detecting means 104 for detecting vibratory state of the torsion torque on the basis of output of the torsion torque detecting means 103, a rough-road/judder discriminating means 105 for discriminatively deciding a judder indicative of vibration of the driving wheel due to torsion of the driving shaft on one hand and a vibration of the driving wheel occurring when the motor vehicle runs on a rough road on the other hand, a judder-ascribable vibration suppressing control means 107 for suppressing vibration of at least one of the driving wheels by regulating the braking hydraulic pressure through the medium of the braking hydraulic pressure regulating means in response to the decision of occurrence of the judder made by the rough-road/judder discriminating means 105, and a rough-road control means 109 for regulating the braking hydraulic pressure to suppress the lowering of the braking hydraulic pressure or alternatively promoting the increase of the braking hydraulic pressure for at least one of the driving wheels in response to the decision made by the rough-road/judder discriminating means 105 to the effect that the wheel vibration is ascribable to the rough road, as shown in FIG. 1A.

In the anti-lock brake control system mentioned above, the rough-road/judder discriminating means 105 may be comprised of a judder decision means 106 for deciding that the wheel vibration is a vibration which is brought about due to torsion of the drive shaft of the motor vehicle and a rough-road decision means 108 for deciding that the wheel vibration is a vibration which occurs when the motor vehicle is running on a rough road.

Further, by detecting the vibration of the wheel as well as the vibration of torsion torque and comparing the vibration period of the wheel with that of the torsion torque determined on the basis of the detected vibrations of the wheel and the torsion torque, respectively, it can be decided that the vibration of the wheel is ascribable to the torsion torque and thus the vibration of the wheel is due to the so-called judder phenomenon when both the periods mentioned above coincide with each other at least approximately. On the other hand, unless both the above-mentioned periods coincide with each other, this means that other torque than the torsion torque of the drive shaft is applied to the wheel, i.e., that the behavior of the driving wheel is affected by the road condition. Thus, it can be decided that the motor vehicle is running on a rough road (bad road of irregular surface) unless coincidence is found between both the vibration period of the wheel and the period of the torsion torque.

Thus, in the anti-lock brake control system according to the invention, the torsion torque vibration detecting means 104 may be composed of a torsion torque vibration period measuring means 104*a* for measuring a torsion torque vibration period at which the torsion torque detected by the torsion torque detecting means 103 reaches a predetermined value. Further, the wheel vibration detecting means 102 may be composed of a wheel acceleration arithmetic means 102*a* for determining a wheel acceleration by determining a rate of change of the wheel speed and a wheel vibration period measuring means 102*b* for measuring a period at which the wheel acceleration reaches a predetermined value, as shown in FIG. 1A. Then, the rough-road/judder discriminating means 105 may be so designed as to decide that the wheel vibration is brought about by the rough-road condition when the wheel vibration period is greater than a predetermined value inclusive and when difference between the wheel vibration period and the torsion torque vibration period is greater than a predetermined value inclusive, while deciding that the wheel vibration is due to judder when the wheel vibration period is smaller than the first mentioned predetermined value and when the difference between the wheel vibration period and the torsion torque vibration period is smaller than the second mentioned predetermined value.

When a torsion is applied to the drive shaft for the driving wheels, the equation of motion of the wheel in which the torsion is taken into consideration can be expressed as follows:

$$Iw \cdot (d\omega/dt) = \mu \cdot W \cdot r - Tb - Tt \tag{1}$$

where Iw represents moment of inertia of the wheel,

ω represents an angular velocity of the wheel (being assumed that the direction in which the driving wheel rotates when the motor vehicle is running forwardly is the forward rotation), Tt represents a torsion torque, μ represents a coefficient of friction of a road surface, W represents a load imposed on the wheel, r represents a radius of the wheel, and Tb represents a brake torque.

Relation between the wheel angular velocity ω and the wheel acceleration Gw can be given as follows:

$$Gw = Kr(d\omega)/dt \tag{2}$$

where Kr represents a constant.

Accordingly, relation between the wheel acceleration Gw and the torsion torque Tt can be given as follows:

$$Gw = (Kr/Iw) \cdot (\mu \cdot W \cdot r - Tb - Tt) \tag{3}$$

Since the wheel is caused to vibrate under the action of the torsion torque Tt upon occurrence of the judder, the wheel acceleration Gw and the torsion torque Tt bear a reverse phase relation to each other, as can be seen from the above expression (3). This means that when the wheel acceleration increases, the torsion torque decreases and vice versa.

Accordingly, it is possible to detect difference in phase between the torsion torque and the wheel acceleration by detecting rise of the wheel acceleration and fall of the torsion torque, respectively, or alternatively fall of the wheel acceleration and rise of the torsion torque, respectively. On the basis of the phase difference between the torsion torque and the wheel acceleration, the influence of the torsion torque exerted to the driving wheel, i.e., vibration of the driving wheel due to the torsion torque, can be determined. In other words, decision can be made on the basis of the above-mentioned phase difference as to whether the wheel vibration is bought about by the judder or the rough road condition. Namely, when the phase difference corresponds to the reverse phase relation mentioned above, it can be decided that the wheel vibration is due to the judder. On the other hand, unless the phase difference corresponds to the reverse phase relation mentioned above, it can be decided that the wheel vibration is ascribable to the rough-road condition.

Thus, in the anti-lock brake control system according to the present invention, the torsion torque vibration period measuring means 104a may be so designed as to measure a time lapsed from a time point at which the wheel acceleration reached a predetermined value as detected by the wheel acceleration arithmetic means 102a to a time point at which the torsion torque attains a predetermined value within a predetermined time period. In this case, the rough-road/judder discriminating means 105 may be so designed as to decide that the wheel vibration is ascribable to rough-road condition when the time measured by the torsion torque vibration period measuring means 104a is greater than a predetermined value inclusive, while deciding that the wheel vibration is due to judder when the time measured by the torsion torque vibration period measuring means 104a is smaller than the predetermined value.

The amplitude of the wheel acceleration, i.e., difference between the maximum value and the minimum value of the wheel acceleration, can be determined on the basis of the torsion torque, tire torque and the brake torque in accordance with the following expression (4) which can be derived from the expression (3) mentioned previously. Namely, $$|Gw| = (Kr/Iw) \cdot |\mu \cdot W \cdot r - Tb - Tt| \tag{4}$$

In this conjunction, the tire torque undergoes no vibration unless the load imposed on the wheel changes as in the case of where the motor vehicle is running on a road having a substantially smooth road surface. Further, when the braking hydraulic pressure is held constant or increased only gently, the brake torque changes only gradually. Accordingly, the tire torque and the brake torque have maximum and minimum values which are substantially equal to each other. In other words, the amplitudes of the tire torque and the brake torque may be neglected. Thus, the above-mentioned expression (4) can be rewritten as follows:

$$|Gw| \approx (Kr/Iw) \cdot |Tt| \tag{5}$$

As can be seen from the above expression, upon occurrence of judder, relation between the amplitude of the wheel acceleration and that of the torsion torque can be given by a constant ratio.

On the other hand, when the motor vehicle is running on a rough road, the coefficient of friction of the road surface and the load acting on the wheel undergo variations. Besides, because the tire torque changes significantly, the expression (5) can no more be satisfied. To say in another way, when the motor vehicle is running on a rough road, the amplitude of the wheel acceleration becomes greater than that of the torque.

As a result of this, it can be decided that the judder is taking place when the ratio of amplitude between the wheel acceleration and the torsion torque lies within a predetermined range (or is smaller than a predetermined value inclusive). On the other hand, when the amplitude ratio exceeds the predetermined range (or is greater than the predetermined value), the wheel vibration can be decided as being ascribable to the rough road.

Thus, in the anti-lock brake control system according to the present invention, the wheel vibration detecting means 102 may be composed of a wheel acceleration arithmetic means 102a for determining a wheel acceleration by determining a rate of change in the wheel speed, and a wheel vibration amplitude calculating means 102c for arithmetically determining a maximum value or alternatively a minimum value of the wheel acceleration as a wheel vibration amplitude value representing the amplitude of the wheel vibration. On the other hand, the torsion torque vibration detecting means 104 may be composed of a torsion torque vibration amplitude calculating means 104b for arithmetically determining a maximum value or alternatively a minimum value of the torsion torque as a torque amplitude value representing the amplitude of the torque variation, as shown in FIG. 1B. In that case, the rough-road/judder discriminating means 105 may be so designed as to decide that the wheel vibration is ascribable to rough-road condition when a ratio between the wheel acceleration amplitude value and the torsion torque amplitude value is greater than a predetermined value inclusive while deciding that the wheel vibration is due to judder when the ratio between the wheel acceleration amplitude value and the torsion torque amplitude value is smaller than the predetermined value.

A corrected acceleration Gc derived by correcting the wheel acceleration Gw with the torsion torque Tt can be given as follows:

$$Gc = Gw + (Kr/Iw) \cdot Tt \qquad (6)$$

From the expression (3), the following expression (7) applies valid.

$$Gc = (Kr/Iw) \cdot (\mu \cdot W \cdot r - Tb) \qquad (7)$$

Thus, the relation between the tire torque $\mu \cdot W \cdot r$ determined from repulsion $\mu \cdot W$ of the road surface given as a product of the road surface friction coefficient $\mu$ and the load W on one hand and the brake torque Tb generated by the braking hydraulic pressure on the other hand can be determined in terms of the corrected acceleration Gc.

More specifically, upon occurrence of judder, neither the coefficient of friction of the road surface nor the braking hydraulic pressure changes any appreciably. Thus, neither the tire torque $\lambda \cdot W \cdot r$ nor the brake torque Tb changes periodically, and thus difference between the tire torque $\mu \cdot W \cdot r$ and the brake torque Tb is held to be substantially constant. In other words, the corrected acceleration Gc assumes a substantially constant value in accordance with the expression (7). By contrast, when the motor vehicle runs on a rough road, the tire torque undergoes appreciable variation, bringing about change in the difference between the tire torque and the brake torque. In other words, the corrected acceleration Gc vibrates when the motor vehicle is running on a rough road.

Thus, when the wheel is vibrating, decision may be made that the vibration of the wheel is ascribable to the judder, if the wheel acceleration Gw vibrates at a predetermined period with the corrected acceleration Gc exhibiting no definite vibration behavior. By contrast, when both the wheel acceleration and the corrected acceleration vibrate at a substantially same period, it can then be decided that the vibration of the wheel is not due to the torsion torque but brought about by the rough or irregular surface of the road.

Thus, in the anti-lock brake control system according to the present invention, the wheel vibration detecting means 102 may be composed of a wheel acceleration arithmetic means 102a for determining a wheel acceleration by determining a rate of change of the wheel speed, a wheel vibration period measuring means 102b for measuring a wheel vibration period at which the wheel acceleration reaches the predetermined value, a corrected acceleration arithmetic means 111 for determining a corrected acceleration by correcting the wheel acceleration by adding thereto the torsion torque, and a corrected acceleration vibration period measuring (or detecting) means 112 for measuring a period at which the corrected acceleration reaches predetermined value, as shown in FIG. 2. In that case, the rough-road/judder discriminating means 105 may be so designed as to decide that the wheel vibration is due to a rough-road condition when the wheel vibration period is greater than a predetermined value inclusive and when the vibration period of the corrected acceleration is greater than a predetermined value inclusive, while deciding that the wheel vibration is ascribable to judder when the vibration period of the corrected acceleration is smaller than the predetermined value.

Now, the present invention will be described in detail in conjunction with what is presently considered as preferred or typical embodiments thereof by reference to the drawings. In the description, like reference characters designate like or corresponding parts throughout the several views. Also in the following description, it is to be understood that such terms as "left", "right", "rear", "front" and the like are words of convenience and are not to be construed as limiting terms.

Embodiment 1

Figure 3:
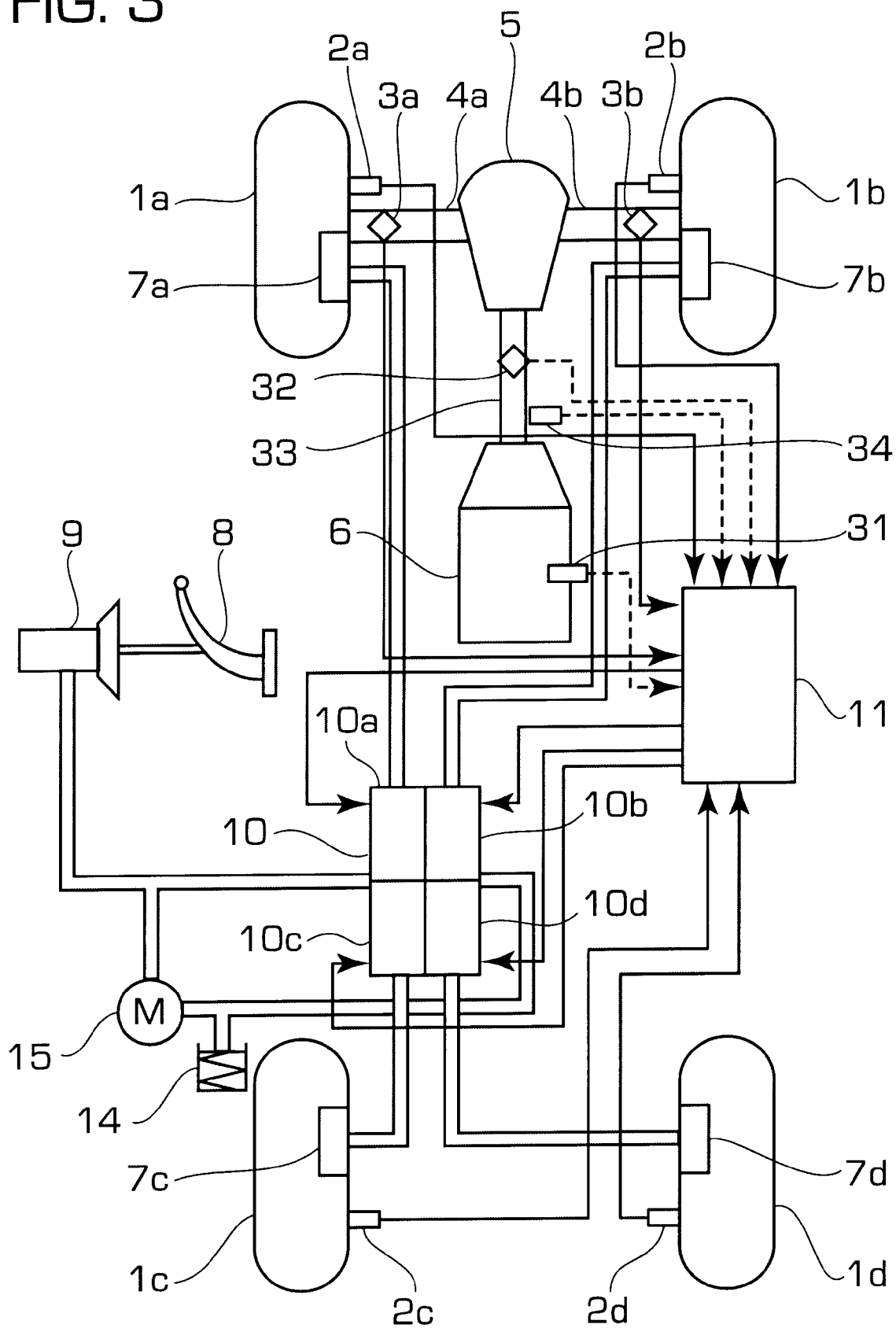
FIG. 3 is a schematic diagram showing a general arrangement of the anti-lock brake control system for a motor vehicle according/to an embodiment of the present invention.
Figure 4:
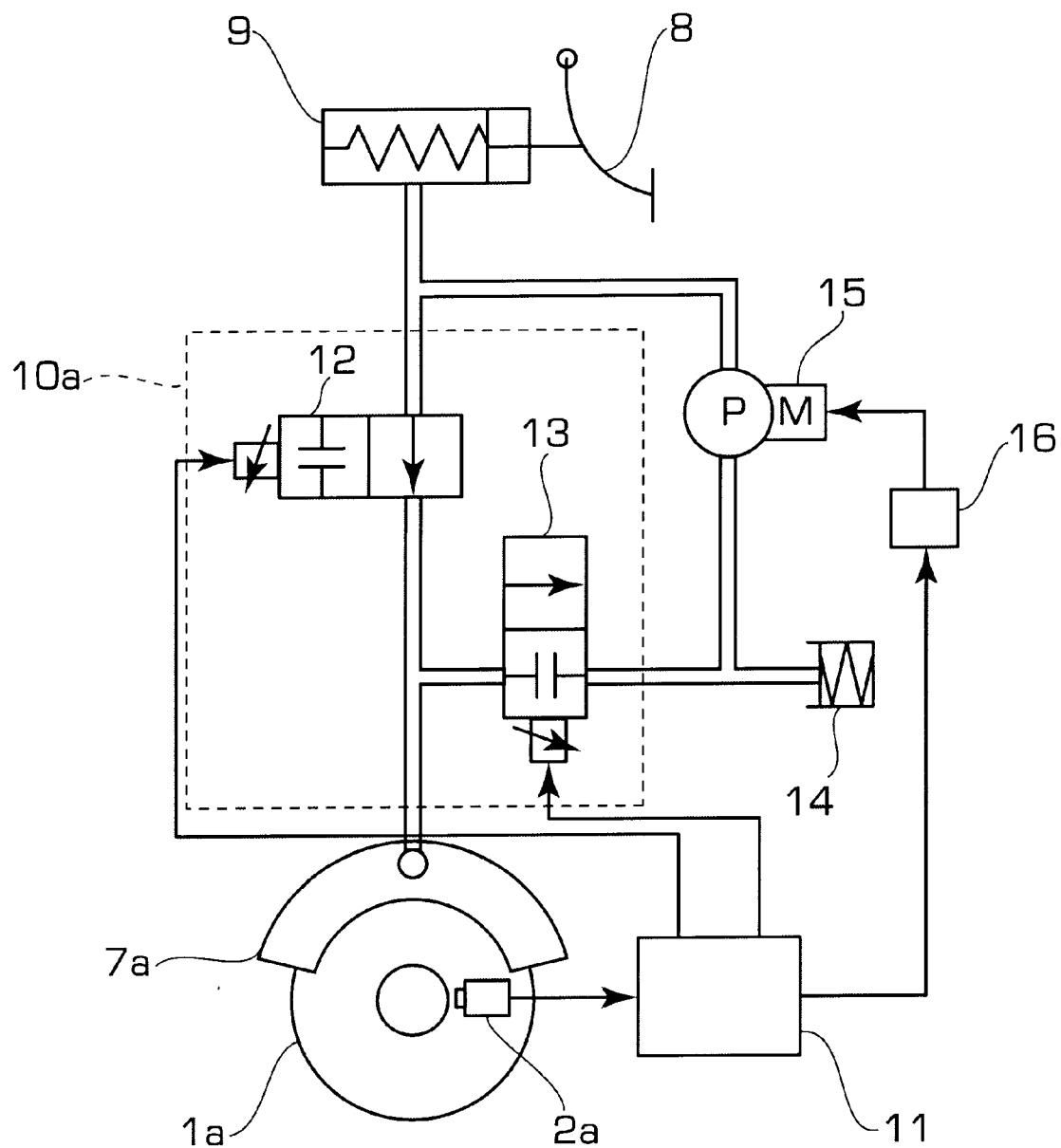
FIG. 4 is a diagram showing in detail a structure of an actuator system employed as a braking hydraulic pressure regulating means provided in association with a driving wheel in the anti-lock brake control system shown in FIG. 3.
Figure 5:
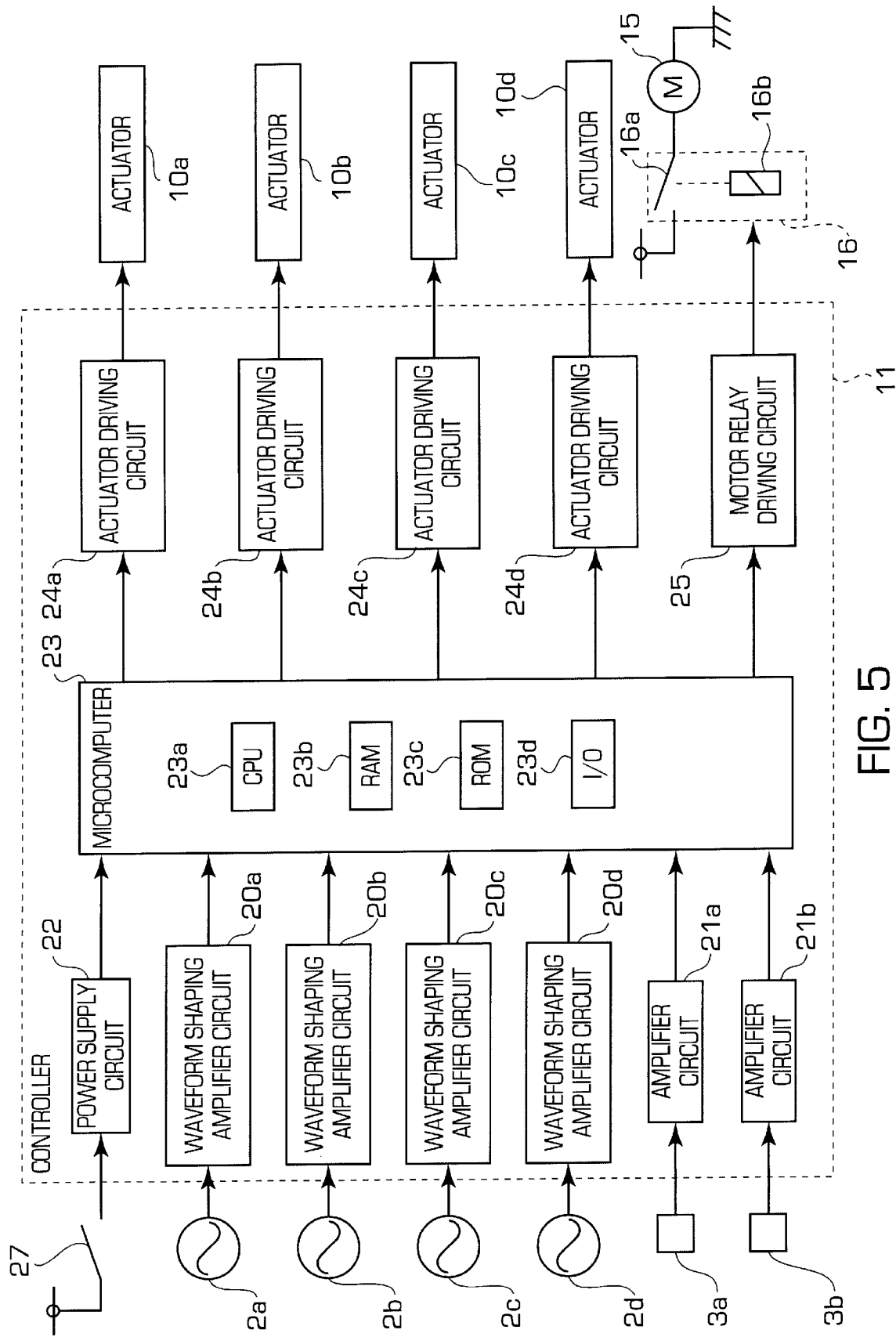
FIG. 5 is a block diagram showing in detail a configuration of a controller employed in the system shown in FIGS. 3 and 4.

An anti-lock brake control system according to a first embodiment of the present invention will now be described by referring to FIGS. 3 to 5, in which FIG. 3 is a schematic diagram showing a general arrangement of the anti-lock brake control system mounted on a motor vehicle, FIG. 4 is a diagram showing in detail a structure of an actuator shown in FIG. 3, and FIG. 5 is a block diagram showing in detail a system configuration of a controller shown in FIGS. 3 and 4.

Referring to FIG. 3, wheel speeds of individual wheels of a motor vehicle are detected by wheel speed sensors 2a to 2d (designated generally by reference numeral 2) each of which may be constituted by an electromagnetic pick-up type sensor or photoelectric transducer type sensor known per se. More specifically, the wheel speed sensor 2a is mounted on the motor vehicle at a position near to a wheel 1a to generate a rotation speed signal indicating the rotation speed of the wheel 1a. Similarly, the wheel speed sensors 2b to 2d are mounted at positions located in the vicinity of the driving wheels 1b to 1d, respectively, to thereby generate rotation speed signals indicative of the rotation speeds of these wheels, respectively. Parenthetically, these wheel speed sensors 2a to 2d (also designated by reference numeral 2 representatively or collectively) cooperate to constitute the wheel speed detecting means 101 mentioned previously in the anti-lock brake control system according to the instant embodiment of the invention.

As can be seen in FIG. 3, the driving wheels 1a and 1b are operatively coupled to an internal combustion engine (hereinafter simply referred to as the engine) 6 of the motor vehicle by way of axle shafts 4a and 4b and a differential mechanism 5, wherein the axle shafts 4a and 4b (also designated by reference numeral 4 representatively or collectively) are provided with torque sensors 3a and 3b (also designated by reference numeral 3 representatively or collectively) for detecting torsion torque applied to the axle shafts 4a and 4b, respectively. Parenthetically, the axle shaft (4a, 4b) may also be referred as to the driving shaft. When the motor vehicle to be controlled is a front-wheel driving type, the front wheel serves as the driving wheels 1a and 1b with the rear wheels being non-driving wheels 1c and 1d. On the other hand, in the case of the motor vehicle of the rear-wheel driving type, the rear wheels function as the driving wheels 1a and 1b with the front wheels being the non-driving wheels 1c and 1d. The torque sensors 3a and 3b are installed in association with the driving wheels and may be implemented in the form of a bridge-circuit type strain gauge mounted on each of the axle shafts 4a and 4b so that the strain gauge undergoes distortion corresponding to the magnitude of torsion torque applied to the axle shaft 4a; 4b, wherein the distortion is detected as a change in the voltage appearing across both the terminal of the bridge circuit constituting the strain gauge. The voltage signal outputted from the strain gauge is sent to a controller 11 via a slip ring or in the form of a radio signal. In this manner, the outputs of the torque sensors 3a and 3b mounted on the axle shafts 4a and 4b can be transmitted to the controller 11. Parenthetically, the torque sensors 3a and 3b cooperates to constitute the torsion torque detecting means 103 in the anti-lock brake control system according to the instant embodiment of the invention.

Provided in association with the wheels 1a to 1d are braking devices 7a to 7d, respectively, which serve as the braking means.

A master cylinder 9 is operatively connected to a brake pedal 8. When the brake pedal 8 is depressed, a brake application pressure of a magnitude corresponding to the depression stroke of the brake pedal 8 is generated by the master cylinder 9. The brake application pressure generated by the master cylinder 9 is adjusted or regulated by the actuator means 10 in accordance with the output of the controller 11, as will be described in detail hereinafter, whereupon the brake application pressure is sent to the braking devices 7a to 7d, respectively. The actuator means 10 is constituted by actuators 10a to 10d corresponding to the braking devices 7a to 7d provided in association with the braking devices 7a to 7d for the wheels 1a to 1d, respectively, wherein the actuators 10b to 10d are operatively coupled to the braking devices 7b to 7d, respectively. Incidentally, the actuator means 10 constitutes a braking hydraulic pressure regulating means.

The controller 11 is designed to receive the signals from the wheel speed sensors 2 and the torque sensors 3 for performing arithmetic operations and control processings for the anti-lock brake control on the basis of the signals mentioned above to thereby generate output signals for driving the actuator means 10.

The actuator means 10 is implemented in such a structure as shown in FIG. 4. Since the actuators 10a to 10d constituting the actuator means 10 are realized in a same structure, the following operation will be directed to the actuator 10a as the representative, being understood that the other actuators 10b to 10d are essentially of the same structure as the actuator 10a. The actuator means 10 includes a pressure-holding solenoid valve 12 installed in a hydraulic pipe extending from the master cylinder 9 to the braking device 7a and a pressure-reducing solenoid valve 13 installed on a hydraulic fluid recovering pipe which extends from the braking device 7a to the master cylinder 9 by way of the reservoir tank 14 and a hydraulic fluid recovery pump 15. Operations of the pressure-holding solenoid valve 12 and the pressure-reducing solenoid valve 13 for controlling the supply of hydraulic oil to the braking device 7a are effectuated by electrically energizing or deenergizing the solenoids thereof under the control of the controller 11. Further, a motor relay 16 is provided for turning on/off the power supply to an electric motor incorporated in a pump 15 in dependence on the output of the controller 11.

With the structure of the actuator 10 described above, a hydraulic pressure is supplied to the master cylinder 9 upon depression of the brake pedal 8, as a result of which a brake fluid or oil flows from the master cylinder 9 into the braking device 7a, . . . , 7d by way of the pressure-holding solenoid valve 12 of the actuator means 10, whereby the brake application pressure is increased internally of the braking device 7a, . . . , 7d.

When a pressure-reducing signal is outputted from the controller 11, the pressure-holding solenoid valve 12 and the pressure-reducing solenoid valve 13 are electrically energized, which results in that the brake fluid passage extending between the master cylinder 9 and the braking device 7a, . . . , 7d is interrupted or closed, whereas a brake fluid passage between the braking device 7a, . . . , 7d and the reservoir tank 14 is opened. Consequently, the braking hydraulic pressure within the braking device 7a, . . . , 7d is released to the reservoir tank 14, whereby the brake application pressure is lowered. At the same time, the motor relay 16 is closed, whereby the motor of the hydraulic fluid recovery pump 15 is put into operation. As a result of this, the hydraulic pressure within the reservoir tank 14 is increased. The hydraulic fluid within the reservoir tank 14 is thus fed back to the master cylinder 9 in preparation for the succeeding control.

Thereafter, a hold signal is outputted from the controller 11 for maintaining only the pressure-holding solenoid valve 12 in the electrically energized state, whereby all the braking hydraulic pressure pipes or paths are interrupted with the brake application pressure being held to be constant.

On the other hand, when a pressure-increasing signal is issued from the controller 11, the electric currents supplied to the pressure-holding solenoid valve 12 and the pressure-reducing solenoid valve 13 are interrupted, which results in that the hydraulic path between the master cylinder 9 and the braking device 7a, . . . , 7d is again established. As a consequence, the high-pressure brake fluid fed back to the master cylinder 9 as well as the brake fluid discharged from the hydraulic fluid recovery pump 15 is caused to flow into the braking device 7a, . . . , 7d, whereby the brake application pressure is increased.

As will now be appreciated from the above, the brake application pressure is adjusted or regulated by repeating the pressure reducing operation, the pressure holding operation and the pressure increasing operation in accordance with the commands issued from the controller 11. In this way, the anti-lock brake control for the motor vehicle is realized.

The controller 11 is implemented in such a configuration as shown in FIG. 5. As can be seen in the figure, the controller 11 includes waveform shaping amplifier circuits 20a, 20b, 20c and 20d (designated representatively by reference numeral 20) which serve for shaping the output signals of the wheel speed sensors 2a, 2b, 2c and 2d (designated representatively by numeral 2) into signal pulses for the processings executed by a microcomputer 23, and a power supply circuit 22 which serves for supplying a predetermined constant voltage to the microcomputer 23 and other devices in response to closing (turn-on) of an ignition switch 27 of the motor vehicle. The microcomputer 23 includes a CPU (Central Processing Unit) 23a, a RAM (Random Access Memory) 23b, a ROM (Read-Only Memory) 23c, an input/output interface 23d and others. Further, the controller 11 includes actuator driving circuits 24a, 24b, 24c and 24d (designated representatively by numeral 24) which output driving signals for driving the actuators 10a, 10b, 10c and 10d, respectively, in response to the control signals outputted from the microcomputer 23, and a driving circuit 25 which serves for electrically energizing a coil 16b of the motor relay 16 to thereby hold a normally opened contact 16a of the relay 16 in the on-state (closed state).

Figure 6:
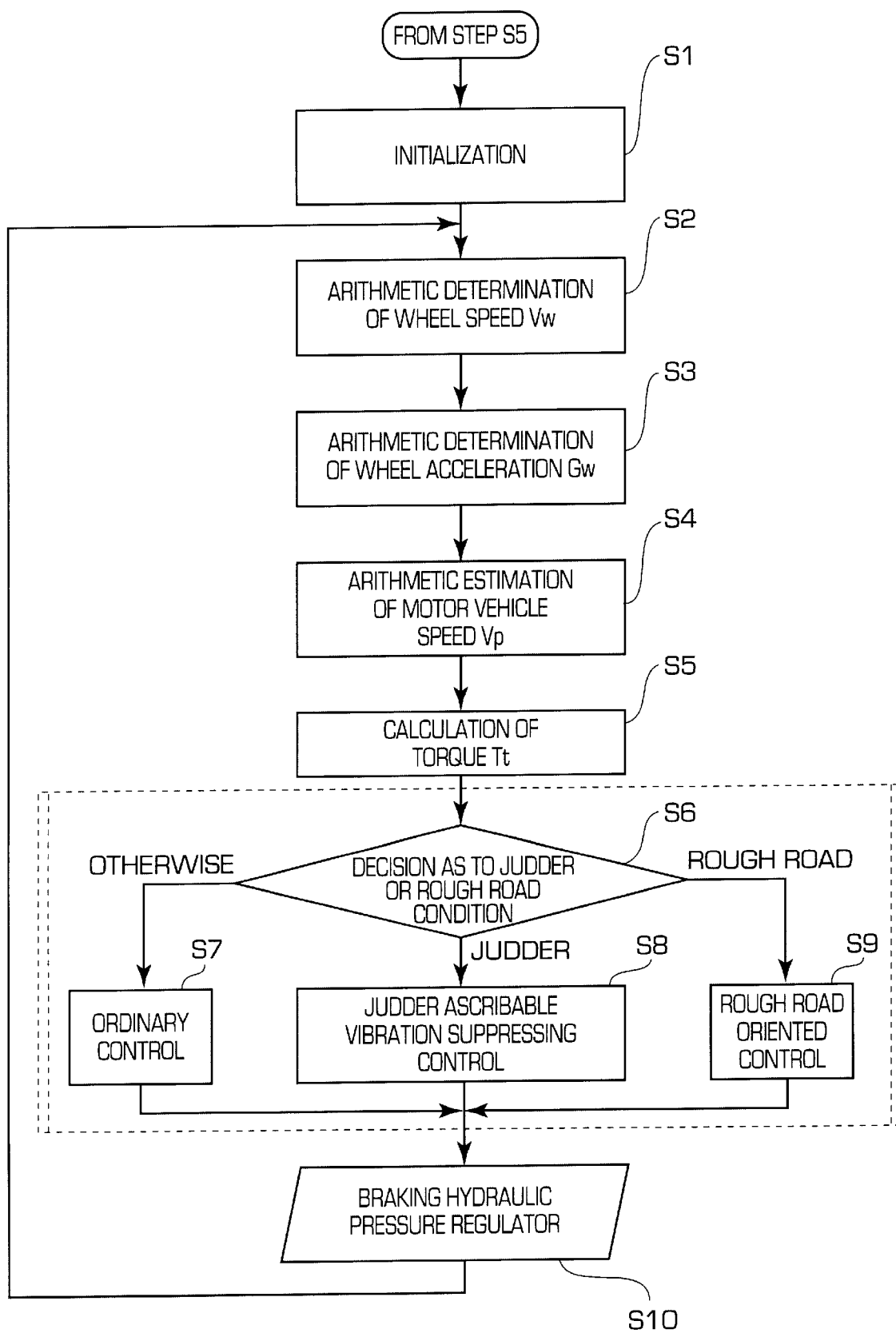
FIG. 6 is a flow chart for illustrating a flow of processings executed by a micro computer incorporated in the controller according to an embodiment of the invention.
Figure 7:
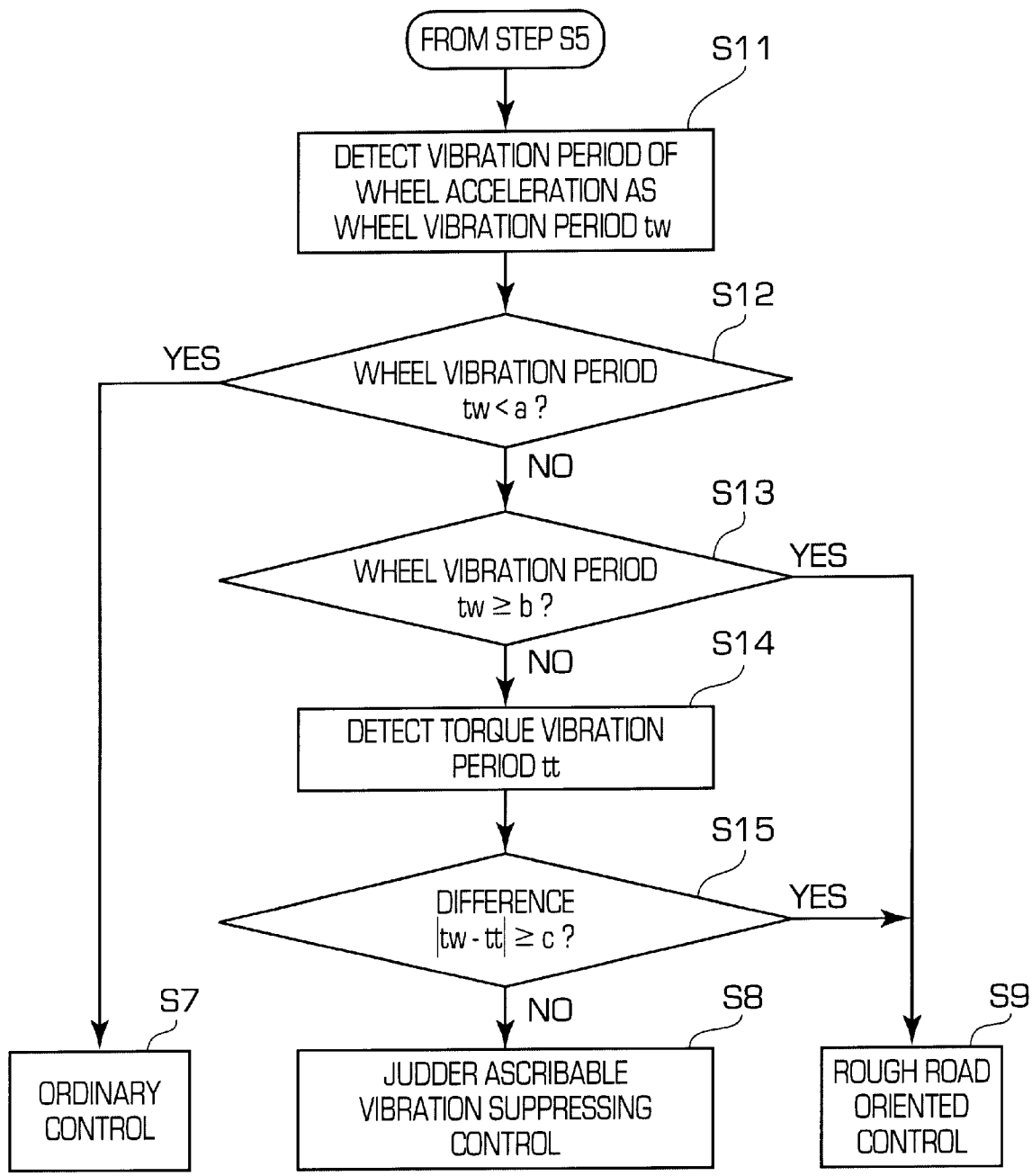
FIG. 7 is a flow chart for illustrating a flow of processings for deciding discriminatively whether vibration of driving wheels of a motor vehicle is ascribable to judder or rough-road condition according to an embodiment of the invention.

Next, referring to flow charts shown in FIGS. 6 and 7, description will be directed to the processing operations of the microcomputer 23 incorporated in the controller 11 of the structure described above. In the first place, general processing flow will be explained by reference to FIG. 6. In a step S1, initialization of the RAM 23b and the input/output interface 23d is performed.

Subsequently, the wheel speed Vw is arithmetically determined in a step S2. More specifically, upon reception of the pulse signals having the pulse frequencies indicative of the rotation speeds of the individual wheels 1a, . . . , 1d from the waveform shaping amplifier circuits 20a, . . . , 20d, the microcomputer 23 starts the wheel speed arithmetic processing (step S2) and at the same time starts the counting of the pulse number Pn for the purpose of measuring the time lapse Tn from the start of the pulse counting operation. On the basis of the value of the count value Pn and the time lapse Tn thus obtained, the wheel speed Vw is calculated in accordance with the following expression (8):

$$Vw = Kv \cdot (Pn/Tn) \tag{8}$$

where Kv represents a coefficient or constant which can be determined in consideration of the diameter of the wheel, characteristics of the wheel speed sensor 2 and other factors. At this juncture, it should be mentioned that the above-mentioned process for determining the wheel speed Vw is only by way of example, and other method may be resorted to.

In a succeeding step S3, wheel acceleration Gw is arithmetically determined on the basis of the wheel speed Vw determined in the step S2. To this end, a difference between the wheel speed Vw determined in the step S2 during the currently executed processing period TL on one hand and the wheel speed Vw1 determined in the corresponding step S2 in the immediately preceding processing period on the other hand is determined, whereon the wheel acceleration Gw is arithmetically determined on the basis of the difference mentioned above and the period TL in accordance with the following expression (9):

$$Gw = Kg \cdot (Vw - Vw1)/TL \tag{9}$$

where Kg represents a constant. The wheel acceleration Gw indicates that the wheel rotation is being accelerated when the wheel acceleration Gw is of a plus sign (i.e., when Gw<0 (zero)), while the wheel acceleration Gw of minus sign (i.e., Gw<0) indicates that the wheel speed is being decelerated.

In a step S4, an estimated vehicle speed Vb is estimated on the basis of the wheel speed Vw of the driving wheel $1a, \ldots, 1d$. To this end, the greatest one of the values derived by decreasing the vehicle speed Vb1 obtained one control period before at a gradient or rate of −1g and the values of the wheel speeds Vw of the four driving wheels $1a$ to $1d$ is determined as the estimated vehicle speed Vb.

In a step S5, a torsion torque Tt is determined. More specifically, the voltage signals outputted from the torque sensors $3a$ and $3b$ mounted on the axle shafts $4a$ and $4b$, respectively, are inputted to the microcomputer 23 after having been amplified by the amplifier circuits $21a$ and $21b$, respectively. On the basis of digital values obtained after A/D (analogue to digital conversion) of these input signals, the torsion torque Tt is arithmetically determined by the microcomputer 23.

In a step S6, decision as to judder-ascribable vibration or rough-road-condition-ascribable vibration is performed, which will be elucidated in more detail hereinafter. When this decision processing results in the occurrence of judder, then the processing proceeds to a control step S8 for suppressing the judder-ascribable vibration. On the other hand, when the rough-road condition is detected in the step S6, the processing proceeds to a control step S9 where the brake application pressure is not released nevertheless of the vibration. Furthermore, in the case where neither the judder nor the rough-road condition is determined in the step S6, the processing proceeds to a step S7 in which an ordinary control of the braking hydraulic pressure for the anti-lock brake control is carried out.

More specifically, in the step S7, the ordinary anti-lock brake control is performed in which the wheels are protected against vibration such as encountered in running on a rough road or the judder. To say in another way, the braking hydraulic pressure is decreased, held or increased in dependence on the detected states of the wheels by issuing corresponding control commands to the relevant valves.

Figure 8:
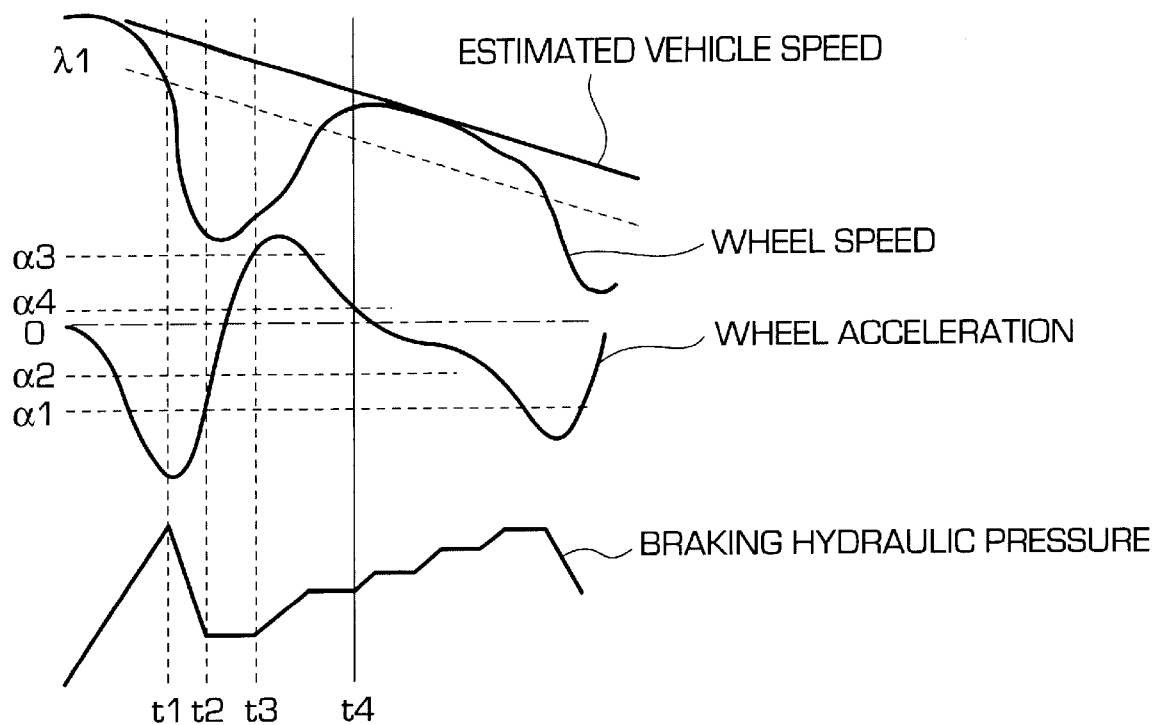
FIG. 8 is a waveform diagram for graphically illustrating changes or variations in an estimated vehicle speed, a wheel speed, a wheel acceleration and a braking hydraulic pressure, respectively, when a motor vehicle is running on a rough road.

Now, reference is made to FIG. 8 which is a view for illustrating the control carried out in the step S7. The valve control command is determined on the basis of the wheel speed Vw and the wheel acceleration Gw for controlling the braking hydraulic pressure P which changes in such manner as illustrated in FIG. 8. Referring to the figure, when the wheel speed Vw decreases steeply and the wheel acceleration Gw attains a preset acceleration value al with the wheel speed Vw decreasing below the estimated vehicle speed Vb by a predetermined value λ1 around a time point t1 as illustrated, a command for decreasing the braking hydraulic pressure P is issued to thereby decrease the braking hydraulic pressure P.

When the wheel speed Vw is prevented from lowering by decreasing the braking hydraulic pressure P with a preset acceleration value α2 being attained, as shown around a time point t2, the command is changed over to the hold command for holding the braking hydraulic pressure P (period between t2 and t3).

When the wheel acceleration Gw increases beyond a preset acceleration value α3, as shown around the time point t3, a hydraulic pressure increasing command is issued to thereby increase the braking hydraulic pressure P steeply.

When the wheel speed approaches to the vehicle speed and is lowered below a preset acceleration value α4, as shown at a time point t4, the braking hydraulic pressure is then increased progressively or gently. With the progressive or gentle increasing of the braking hydraulic pressure, it is contemplated to mean a periodical repetition of execution of the braking hydraulic pressure increasing and hold commands to thereby increase the braking hydraulic pressure with a lower gain than that employed in the ordinary braking hydraulic pressure increasing processing.

As is apparent from the above, in the processing step S7, the brake application pressure is controlled by issuing the hydraulic pressure decreasing, holding and increasing commands on the basis of the wheel speed Vw and the wheel acceleration Gw.

On the other hand, when the vibration of the wheel is decided as being ascribable to the judder, the processing step S8 is executed for suppressing the vibration of the wheel by executing the progressive hydraulic pressure increasing processing with a delay while inhibiting the braking hydraulic pressure from rising up steeply.

Figure 9:
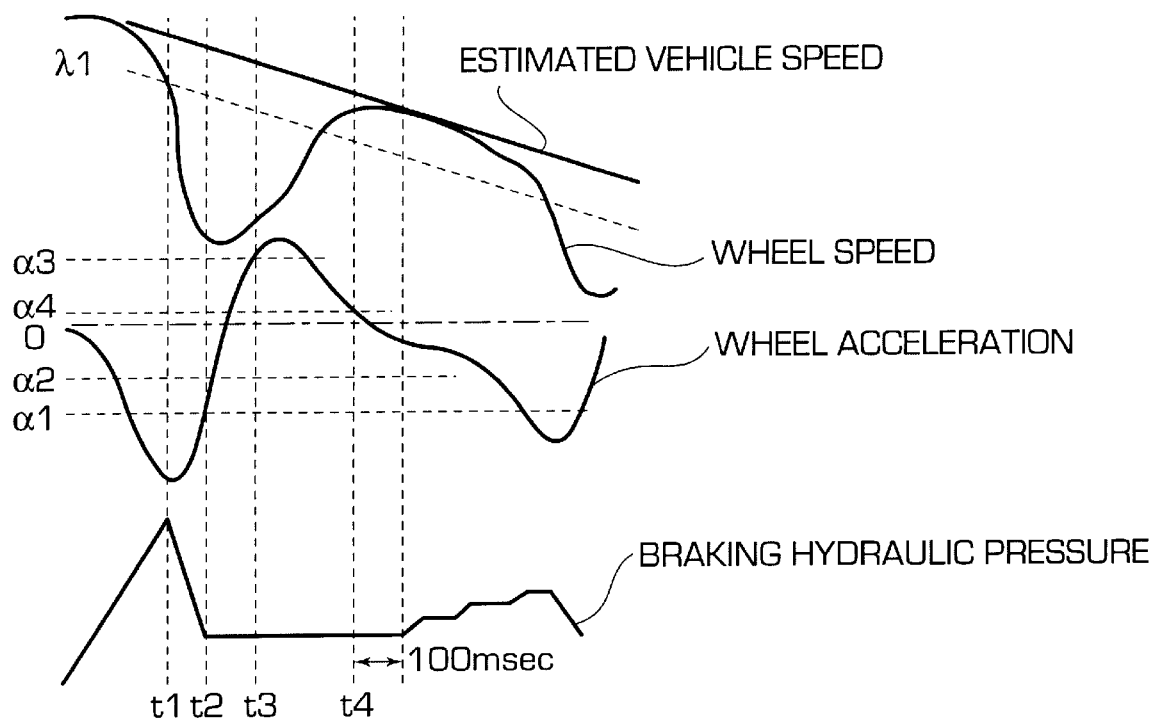
FIG. 9 is a waveform diagram similar to FIG. 8 for illustrating changes or variations of the above-mentioned factors when judder phenomenon is taking place.

At this juncture, the contents of the control performed in the step S8 will be elucidated by reference to a time chart shown in FIG. 9. In the case of the example illustrated in FIG. 8, the hydraulic pressure increasing command is issued at the time point t3. By contrast, in the case of the example illustrated in FIG. 9, no hydraulic pressure increasing command is outputted at the time point t3. Besides, in the case of the example illustrated in FIG. 8, the progressive or gentle increase of the braking hydraulic pressure is effectuated at the time point t4 when the condition therefor is satisfied. However, in the case of the control illustrated in FIG. 9, the progressive or gentle hydraulic pressure increasing command is issued at the time point t4 with a delay of 100 msec after the condition for the progressive or gradual hydraulic pressure increasing has been met. In the other processing steps, similar valve commands as those issued in the step S7 are executed.

In conjunction with the step S9, it is assumed that the wheels suffers vibration due to the rough-road condition. In this case, it is required to perform the control in such a manner that the hydraulic pressure is protected against decreasing in excess. Under the circumstances, the criteria for allowing the hydraulic pressure to decrease is so set as to be difficult to satisfy while the condition for increasing the hydraulic pressure is easy to satisfy.

More specifically, in the rough-road control, the threshold values α1 and α2 for the wheel acceleration in the braking hydraulic pressure decreasing mode shown in FIG. 8 are selected smaller than those employed in the ordinary control step S7 while the threshold value λ1 for the slip is increased, to make it difficult to decrease the braking hydraulic pressure. By contrast, the threshold value α3 for the wheel acceleration Gw in the hydraulic pressure increasing mode is selected smaller to make it easy to increase the braking hydraulic pressure.

Again referring to FIG. 6, in the step S10, signals are supplied to the actuator 10a, . . . , 10d on the basis of the value control commands determined in the vibration suppressing control step S8, the rough-road control step S9 or the ordinary control step S7. Because the actuator 10a, . . . , 10d has only the three operation modes, i.e., the braking hydraulic pressure decreasing mode, the braking hydraulic pressure holding mode and the braking hydraulic pressure increasing mode, the braking hydraulic pressure holding signal is periodically interposed intermittently in the braking hydraulic pressure increasing signal in order to suppress the gain for the braking hydraulic pressure when the brake application pressure is to be increased gently, i.e., with a smaller gain, to thereby increase the gently or progressively the hydraulic pressure when the gain at which the brake application pressure is increased is suppressed. Similar control may equally be applied to the gentle or gradual decreasing of the brake application pressure.

After the processings mentioned above and when the control period of a predetermined temporal duration has lapsed, the step S2 is resumed. This procedure is repeated until the ignition switch 27 is opened or turned off.

Next, description will be made in detail of discriminative determination of judder and rough road determination, i.e., the decision processing in the step S6. This discriminative determination processing is executed by checking the conditions illustrated in FIG. 7.

Figure 10:
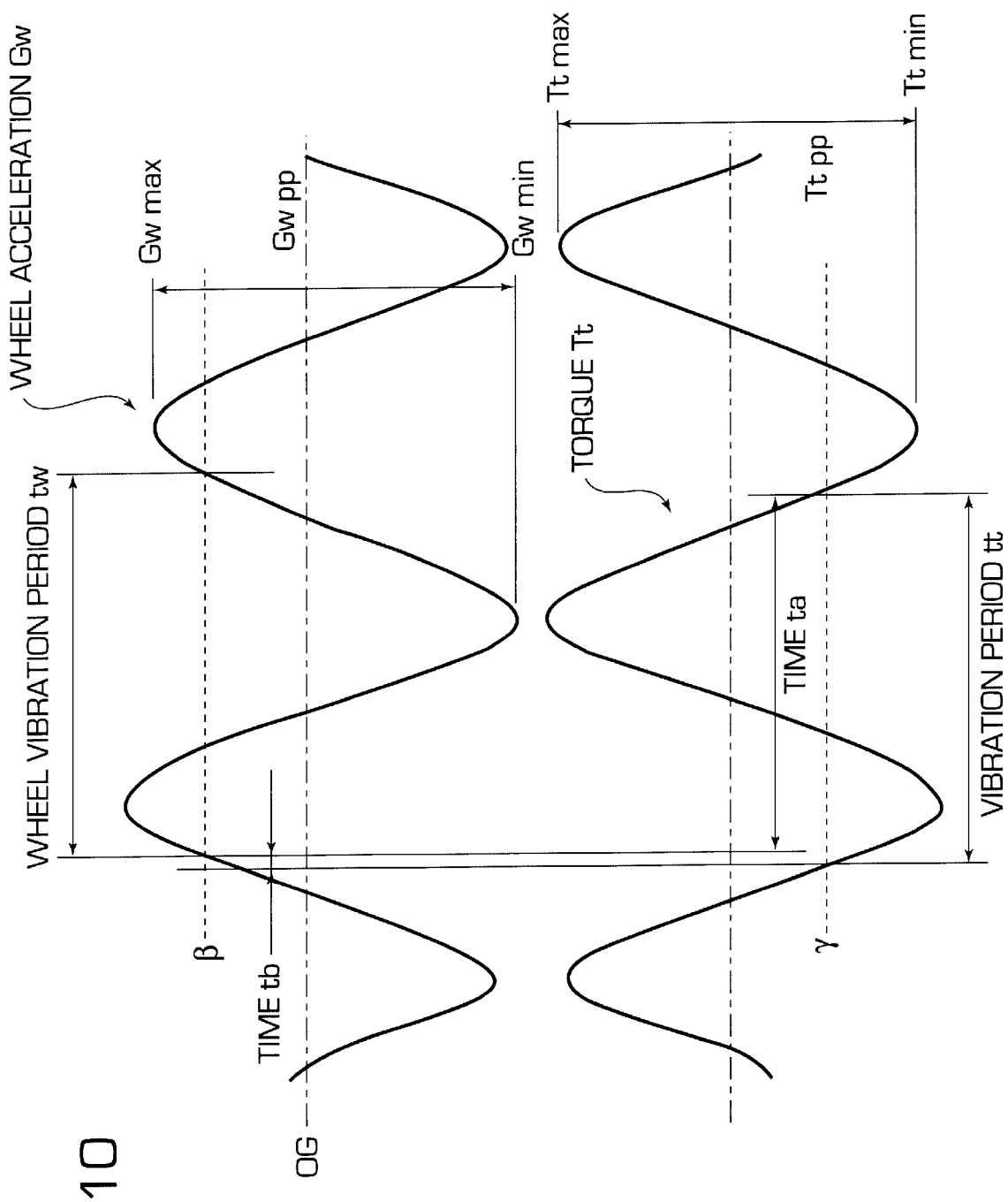
FIG. 10 is a view for illustrating behaviors of wheel vibration and torsion torque vibration in the anti-lock brake control system according to an embodiment of the invention.

In a step S11 shown in FIG. 7, a wheel acceleration period (vibration period tw of the wheel acceleration) is detected. To this end, a time span between a time point when the wheel acceleration Gw exceeds a threshold value β and a succeeding time point at which the threshold value β is again exceeded by the wheel acceleration Gw is measured, as can be seen in FIG. 10. This time span as measured is defined as the wheel vibration period tw.

On the other hand, in a step S14 shown in FIG. 7, a torsion torque vibration period is detected. To this end, a time span between a time point when the torsion torque Tt exceeds a threshold value γ and a succeeding time point at which the threshold value γ is again exceeded by the torsion torque Tt is measured. Refer to FIG. 10. This time span as measured is defined as the vibration period tt of the torsion torque.

In a step S12 shown in FIG. 7, processing for excluding the situation in which the vibration period of the wheel is low, indicating no occurrence of the judder or the vibration as encountered during running on a rough road, is executed. More specifically, when the wheel vibration period tw is shorter than a predetermined period a (i.e., when tw<a), then the ordinary braking hydraulic pressure control processing is performed in the step S7. On the other hand, when the wheel vibration period tw is equal to or longer than the predetermined value a (i.e., when tw≧a), the processing proceeds to a step S13.

In conjunction with the processing in the step S13 shown in FIG. 7, it is to be noted that because the vibration of the torsion torque depends on the behaviors of the wheels and the driving system such as the engine or the like, the frequency band of the torsion torque vibration is usually determined intrinsically in dependence on the type or model of the motor vehicle of concern. Accordingly, when the vibration period of the wheel exceeds the frequency band mentioned above, the vibration of the wheel may be decided as being brought about by the rough road condition. Accordingly, the processing branches to the rough-road control processing in the step S9 when the wheel vibration period tw attains or becomes longer than a predetermined period b (i.e., when tw≧b) in the step S13, while a step S14 is executed when the wheel vibration period tw is smaller than the predetermined period b.

In the step S15, the vibration period of the wheel is compared with the vibration period of the torsion torque for making decision whether the vibration of the wheel is due to the judder or the rough-road condition. More specifically, when the difference between the wheel vibration period tw and the vibration period tt of the torsion torque is greater than a predetermined period c inclusive (i.e., when |tw−tt|≧c), the rough-road control in the step S9 is executed. If otherwise, the processing proceeds to the judder-ascribable vibration suppressing control in the step S8.

At this juncture, it should be mentioned that discrimination between the vibration due to the judder and the vibration due to the rough-road condition can not be made only on the basis of the vibration of the wheel. However, by comparing the vibration of the wheel with that of the torsion torque, it can discriminatively be determined that the vibration of the wheel is ascribable to the judder when the vibration of the wheel and that of the torsion torque exhibit same or similar behavior, while the vibration of the wheel can be decided as being ascribable to the running on the rough road when the vibration of the wheel and that of the torsion torque exhibit different behaviors or when only the vibration of the wheel is detected. More specifically, the state or behavior of the wheel can be represented by the wheel acceleration, while the vibration of the torsion torque can be determined by the period thereof. When comparison between both the periods mentioned above indicates that both the periods are essentially equal to each other, then it is safe to determine that the two vibrations mentioned above (i.e., the vibration of the wheel and that of the torsion torque) are in the same or similar vibratory state. In that case, the vibration of the wheel can be decided as being ascribable to the judder. On the other hand, when the aforementioned comparison results in discrepancy, indicating both the periods are different from each other, then it is decided that the vibration of the wheel is due to the rough-road condition. In this way, by measuring the period of the wheel acceleration and that of the torsion torque for mutual comparison, it is possible to discriminate the wheel vibration due to the judder and that ascribable to the rough-road condition.

The processing steps mentioned above is executed for each of the driving wheels 1a to 1d, while the anti-lock brake control for the driving wheels 1a and 1b is realized by increasing or decreasing the braking hydraulic pressure with the wheel acceleration being corrected by making use of the torsion torque mentioned above. In this junction, it is however noted that any significant torsion torque can not take place in the axle shafts for the non-driving wheels 1c and 1d. Accordingly, for the non-driving wheels 1c and 1d, the processings described above may be executed on the presumption that no torsion torque Tt acts, Tt=0. Further, when the power transmission from the engine 6 to the driving wheels 1a and 1b is interrupted by manipulating the clutch correspondingly, inertia of the engine 6 exerts no influence to the driving wheels 1a and 1b with the torsion torque decreasing substantially to zero (i.e., Tt=0) as in the case of the non-driving wheels 1c and 1d. In other words, since the non-driving wheels 1c and 1d are not connected to the engine 6, the former are immune to occurrence of the judder. Similarly, in the state where the driving wheels 1a and 1b are operatively disconnected from the engine 6 by means of the clutch, neither the driving wheel 1a nor the driving wheel 1b can suffer the judder. Accordingly, when vibration occurs in the wheels in the states mentioned above, it can be decided that the vibration of the wheel is ascribable to the rough-road condition. It should further be added that since the vibration period of the torsion torque can not be measured in the case of the aforementioned situations, the vibration of the wheel does not coincide with the vibration of the torsion torque. Thus, it can be decided that the vibration of the wheel is attributable to the rough-road condition.

Embodiment 2

In the case of the anti-lock brake control system according to the first embodiment of the invention, the vibration period of the and that of the torsion torque are measured, whereon discriminative decision is made on the basis of the two vibration periods as to whether the vibration of the wheel is ascribable to the judder phenomenon or it is brought about by the rough-road condition. According to the invention incarnated in the second embodiment thereof, the same decision is made on the basis of the phase of the wheel acceleration and that of the torsion torque.

Again referring to FIG. 10, when the judder takes place, transmission of torque is validated between the driving wheels and the axle shafts, as can be seen from the expression (3) mentioned hereinbefore. As a result of this, the wheel acceleration assumes a same phase as the torsion torque. Thus, by detecting the phase relation between the wheel acceleration and the torsion torque, it can be determined whether the vibration of the wheel is ascribable to the judder.

Figure 11:
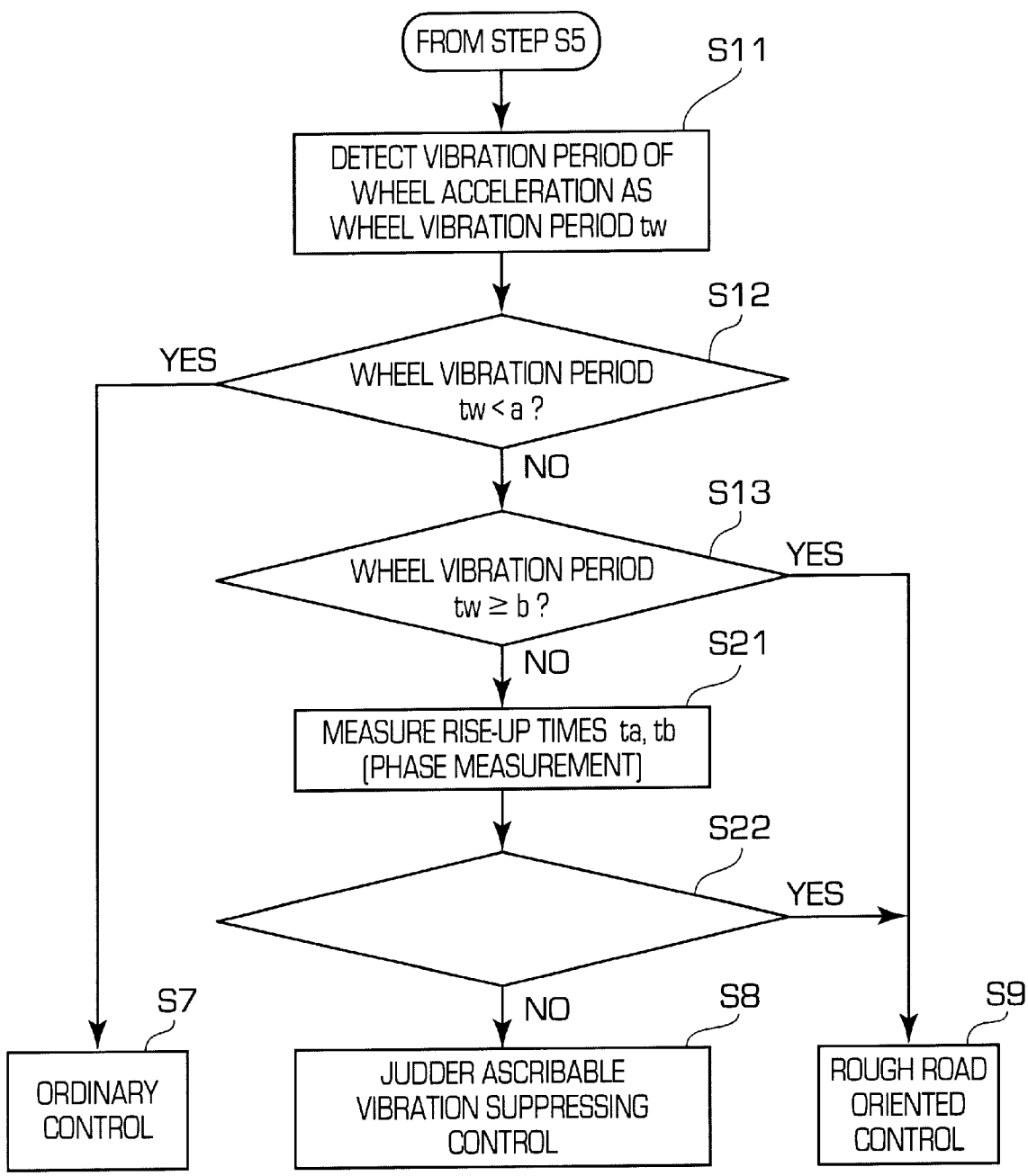
FIG. 11 is a flow chart for illustrating a flow of processings executed by the microcomputer incorporated in the controller for deciding discriminatively whether vibration of driving wheels is ascribable to judder or rough-road condition according to another embodiment of the invention.

FIG. 11 is a flow chart for illustrating a decision process according to the second embodiment of the invention. In FIG. 11, the step S11 to the step S13 are same as those designated by the same reference characters in FIG. 7. Accordingly, repeated description of these steps is omitted. Thus, the following description will be directed to the processing for determining discriminatively the judder and the rough road attributable vibration in the frequency band in which both kinds of vibrations can not be discerned from each other.

Referring to FIG. 11, in a step S21, a processing for detecting a difference in phase between the wheel vibration and the torsion torque is executed. In this processing, a time ta taken for the wheel acceleration to exceed a predetermined value β from a time point at which the torsion torque exceeded a predetermined value λ is measured. Alternatively, a time tb taken for the torsion torque to exceed the predetermined value λ from the time point at which the wheel acceleration exceeded by the predetermined value β may be measured.

In a step S22, processing for identifying discriminatively the judder or the rough-road condition is executed on the basis of decision as to whether or not the phase of the wheel vibration coincides with that of the torque variation. More specifically, when both the times ta and tb are longer than a predetermined time d, the processing proceeds to the rough-road control in a step S9. On the other hand, either one of the time ta or the time tb is shorter than the predetermined time d, the processing proceeds to the judder suppression control executed in the step S8.

In the case where the judder is taking place, the driving wheel vibrates under the effect of the torsion torque. Accordingly, the driving wheel vibrates with a predetermined phase difference relative to the vibration of the torsion torque. More specifically, when the phase of the wheel vibration is opposite to that of the torsion torque, it is safe to say that the timing at which the torsion torque vibrates coincides with the timing at which the wheel vibrates, i.e., both the torsion torque and the wheel are in a same vibrating state. In that case, decision is made that the vibration is ascribable to the judder. If otherwise, the rough-road condition is determined.

Embodiment 3

Figure 12:
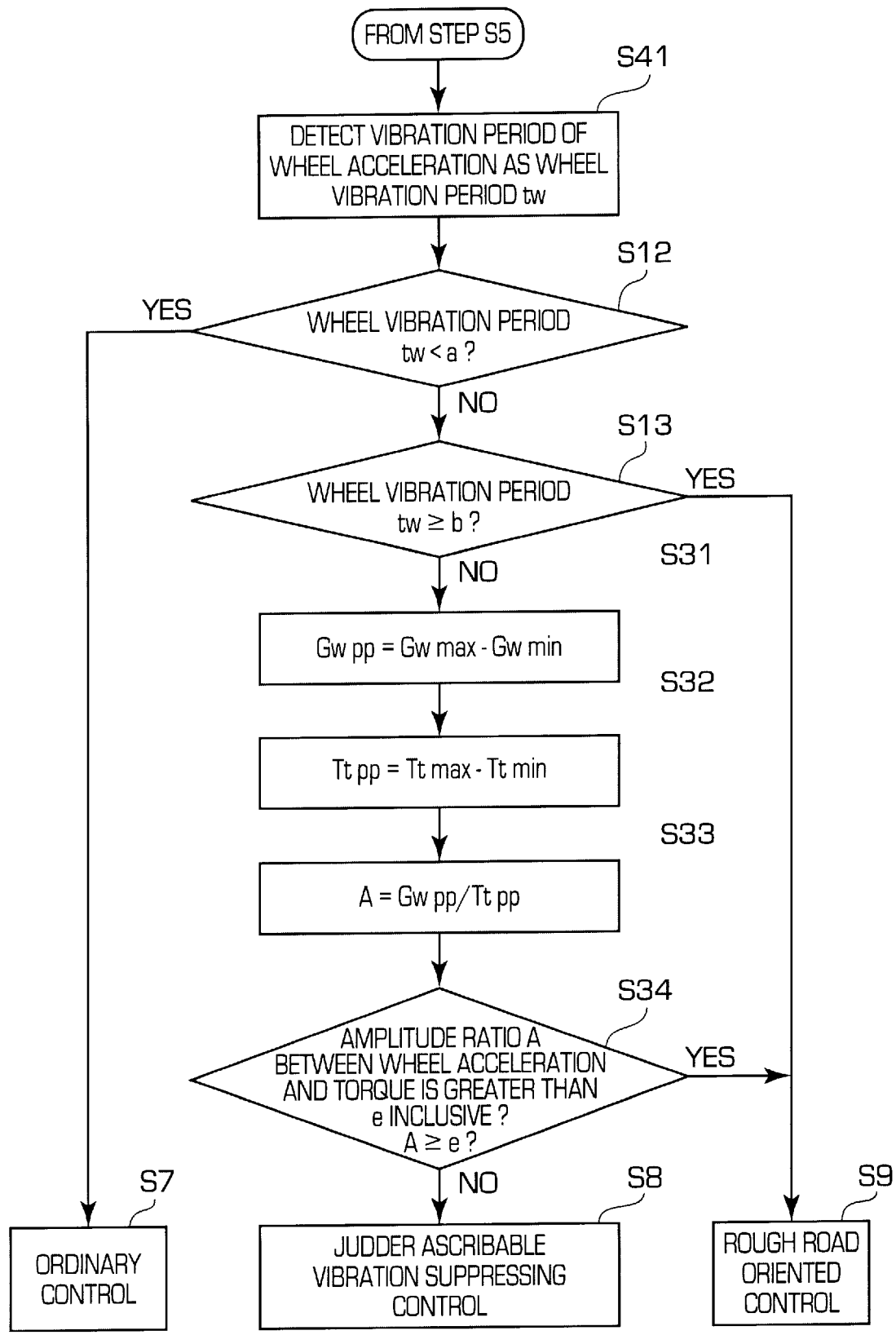
FIG. 12 is a flow chart for illustrating a flow of processings for deciding discriminatively whether vibration of driving wheels is ascribable to judder or rough-road condition according to yet another embodiment of the invention.

In the case of the anti-lock brake control system according to the first embodiment of the invention, the judder-ascribable vibration and the rough road-ascribable vibration are discriminatively determined on the basis of the vibration period of the driving wheel and that of the torsion torque, while in the anti-lock brake control system according to the second embodiment of the invention, the judder and the rough-road conditions are discriminatively identified by taking into consideration the phases of vibrations of the driving wheel and the torsion torque, respectively. According to the concept incarnated in the third embodiment of the invention, the judder-ascribable wheel vibration is determined on the basis of amplitudes of vibrations of the wheel acceleration and the torsion torque, respectively. FIG. 12 is a flow chart for illustrating a processing procedure according to the third embodiment of the invention. In this figure, the step S11 to the step S13 are same as those designated by like reference characters in FIG. 7. Accordingly, repeated description of these steps will be unnecessary.

Referring to FIG. 12, in a step S31, an amplitude Gwpp of the wheel acceleration is determined as a difference between a maximum wheel acceleration Gwmax and a minimum wheel acceleration Gwmin, as shown in FIG. 10. Namely, $$Gwpp=Gwmax-Gwmin \tag{10}$$

In a step S32, an amplitude Ttpp of the torsion torque is arithmetically determined by subtracting a minimum value Ttmin of the torsion torque from a maximum value Ttmax thereof. Namely, $$Ttpp=Ttmax-Ttmin \tag{11}$$

In a step S33, an amplitude ratio A between the wheel acceleration and the torsion torque determined in the aforementioned steps S31 and S32, respectively, is arithmetically determined as follows:

$$A=Gwpp/Ttpp \tag{12}$$

In a step S34, it is decided whether the amplitude ratio A determined as mentioned above is greater than a predetermined value. If so, then the processing proceeds to the step S9 for validating the rough-road control. If otherwise, the processing proceeds to the step S8 for effectuating the judder-ascribable vibration suppressing control.

In the state where the judder phenomenon occurs, the motion or behavior of the wheel is governed by the torsion torque. Accordingly, relation between the amplitude of the wheel acceleration and that of the torsion torque must remain to be constant. Thus, it can be decided that the judder is taking place when the amplitude ratio between the wheel acceleration and the torsion torque is within a predetermined value range. If otherwise (i.e., when the amplitude ratio exceeds the predetermined value range), then decision may be made that the vibration of the wheel is ascribable to the rough-road condition.

Embodiment 4

In the case of the anti-lock brake control system according to the first to third embodiments of the invention, decision is made that the vibration of the wheel is due to the judder when the vibration of the wheel acceleration and that of the torsion torque are of similar vibratory behavior. According to the concept of the invention incarnated in a fourth embodiment thereof, a corrected acceleration is arithmetically determined by adding the torsion torque to the wheel acceleration, whereon decision is made as to whether the vibration of the wheel is ascribable to the judder or the rough-road condition.

The corrected acceleration Gc can be calculated in accordance with the expression (6) mentioned hereinbefore. In this conjunction, it is noted that because the wheel vibrates under the action of the torsion torque when the judder is taking place, the wheel acceleration will then become equal to the torsion torque. For this reason, with the corrected acceleration which represents the parameter indicating the influence of the torsion torque, the torsion torque and the wheel acceleration are mutually canceled out in the expression (7), whereby the vibration of the driving wheel can be given only by a relation between the braking force and the repulsion of the road surface. In other words, the corrected acceleration undergoes no variation under the influence of the judder even when the wheel acceleration vibrates. By contrast, in the case where the motor vehicle runs on the rough road, the repulsion of the road surface varies or vibrates due to irregularity of the road surface. Consequently, the corrected acceleration undergoes vibration similarly to the wheel acceleration. Thus, by detecting the vibration of the corrected acceleration, the rough-road condition and the judder can be identified discriminatively from each other.

FIG. 13 is a flow chart for illustrating a processing procedure according to the fourth embodiment of the invention. In this figure, the step S11 to the step S13 are same as those designated by like reference characters in FIG. 7. Accordingly, repeated description of these steps is omitted.

Referring to FIG. 13, in a step S41, the corrected acceleration Gc is arithmetically determined in accordance with the expression (6) mentioned previously.

In a step S42, processing for detecting vibration period tw of the corrected acceleration is executed. Similarly to the step S11 described hereinbefore, the time taken for the corrected amplitude ratio A to exceed a predetermined value β from a time point when the corrected acceleration exceeded the predetermined value β is measured. This time period is defined as the vibration period tc of the corrected acceleration.

In a step S43, it is checked whether the corrected acceleration is vibrating during the vibration of the wheel acceleration, to thereby discriminate the judder or the rough road. When the vibration period tc of the corrected acceleration becomes equal to or exceeds a predetermined value f, decision is made that the wheel vibration is ascribable to the rough-road condition, whereby the processing proceeds to the step S9. On the other hand, when the vibration period tc of the corrected acceleration is short of the predetermined value f, it is decided that the wheel vibration is due to the judder, whereupon the processing proceeds to the step S8.

When judder is taking place, the motion behavior of the wheel is governed by the torsion torque, as described hereinbefore in conjunction with the third embodiment of the invention. Accordingly, the corrected acceleration represented by a relation between the brake torque and the tire torque from which the torsion torque component has been eliminated is protected against vibration. By contrast, when the tire torque vibrates, as encountered in running on the rough road, the corrected acceleration undergoes vibration. Thus, the judder and the rough-road condition can be identified discriminatively, depending on whether the corrected acceleration is vibrating or not.

Embodiment 5

In the anti-lock brake control systems according to the first to fourth embodiments of the invention described above, the torsion torque is determined on the basis of the outputs of the torque sensors 3 implemented in the form of the strain gauges mounted on the axle shafts 4 operatively coupled to the individual wheels. It should however be mentioned that when the driving wheels 1 are operatively coupled to the engine 6 by way of a differential mechanism 5, similar advantageous effects as those of the anti-lock brake control systems according to the first to fourth embodiments of the invention can be obtained by mounting the torsion torque detecting sensor on the drive shaft 33 such as a propeller shaft or the like in the structure shown in FIG. 3.

Since the left and right wheels coupled operatively to each other via a differential mechanism are applied with the torsion torque of a same magnitude, the torsion torques applied to the left and right wheels, respectively, become equal to each other. Thus, by detecting the torque applied to the drive shaft 33 coupling the engine and the differential mechanism to each other, the torsion torques applied to the left and right wheels can be determined by detecting the torque applied to the drive shaft 33. In that case, the torsion torque applied to each of the left and right wheels has a value equal to a half of the torque applied to the drive shaft 33. Parenthetically, the drive shaft 33 may also be referred to as the driving shaft as in the case of the axle shaft 4.

Embodiment 6

In the case of the anti-lock brake control system according to the first to fifth embodiments of the invention, the torsion torque is determined on the basis of the output signals from the torque sensors 3 constituted by strain gauges mounted on the axle shafts 4a and 4b, respectively, coupled operatively to the individual wheels or alternatively from the torque sensor 3 mounted on the drive shaft 33. However, the torque of concern can equally be detected by detecting the number of rotations of the prime mover such as the engine 6. This concept of the invention is incarnated in a sixth embodiment. In the structure of the motor vehicle shown in FIG. 3, the rotation number (rpm) of the engine is detected by an engine rotation sensor 31 which may be constituted by a crank angle sensor known per se. Since the driving wheels 1a and 1b and the engine 6 are operatively coupled through the medium of the differential mechanism 5, the torques applied to the left and right driving wheels are of same magnitude. Accordingly, by detecting a phase relation between the rotation angle of the driving wheel 1a, 1b and that of the engine 6 to thereby determine the phase difference, it is possible to calculate the torsion angle and hence the torsion torque proportional to the torsion angle.

More specifically, the rotation angle of the engine is determined on the basis of the output signal from the engine rotation sensor 31 which is designed to detect the rotation angle of the engine, while the rotation angles of the driving wheels 1a and 1b are detected by the wheel speed sensors 2a and 2b, respectively. At a time point at which the torsion torque is of small magnitude with torque load of the engine being small, e.g. when the control of the brake application pressure, is not yet started, the rotation angles of the driving wheels 1a and 1b and the engine are reset to zero, assuming that there is no phase difference between the driving wheel 1a, 1b and the engine. Upon starting of the control of the brake application, the pulses derived from the outputs of the wheel speed sensors 2a and 2b provided in association with the driving wheels 1a and 1b and the engine rotation sensor 31 are counted, respectively. On the basis of the count values, the rotation angles θr and θ1 of the driving wheels 1a and 1b and the rotation angle θe of the engine are determined according to a method known per se, whereupon the torsion angle θt is determined in accordance with the following expression:

$$\theta t = Ki \cdot \theta e - (\theta r + \theta 1)/2 \quad (13)$$

Thus, the torsion torque Tt can be determined as a product of the torsion angle θt and rigidity Kp as follows:

$$Tt = Kp \cdot \theta t \quad (14)$$

The torsion torque Tt applied to the left and right driving wheel 1a, 1b is equally applied to the engine. When the acceleration pedal is released in the operation state when the anti-lock brake control system (ABS) is operating, the output torque of the engine becomes smaller. In that case, the engine may be regarded as an object having great inertia. Accordingly, by detecting the change in the engine rotation speed ωe at that time, it is possible to determine the torsion torque applied to the driving wheels in accordance with the following expression (15):

$$Tt = K(d\omega e/dt) \quad (15)$$

As is apparent from the above, the torsion torque can be arithmetically determined on the basis of the rotation angles of the driving wheels 1a and 1b and that of the engine or on the basis of the change in the rotation speed of the engine as brought about by the torque applied to the driving wheels and hence to the engine. The torsion torque determined in this way can be made use of in the anti-lock brake control system according to the first to fourth embodiments, substantially to the same effect.

Embodiment 7

In the anti-lock brake control system according to the sixth embodiment, the rotation number of the engine 6 is detected. However, in place of detecting the engine rotation speed, that of the drive shaft 33 shown in FIG. 3 may be detected. In particular, in the motor vehicle equipped with an automatic transmission, the driving wheels are operatively coupled to the engine through the medium of a torque converter. To say in another way, the driving wheels are not directly connected to the engine, which in turn means that torque is scarcely transmitted from the driving wheels to the engine. In that case, the rotation number (rpm) of the drive shaft 33 may be detected by a shaft rotation sensor 34 to thereby determine the torsion torque through the procedure described above in conjunction with the sixth embodiment, substantially to the same effect.

Embodiment 8

In the case of the anti-lock brake control system according to the first to fourth embodiments of the invention, it has been assumed that the motor vehicle of concern is of a two-wheel driven type. It should however be mentioned that the anti-lock brake control system can equally be applied to a four-wheel driven type motor vehicle for adjusting or regulating the brake application pressure. More specifically, a strain gauge may be provided in association with each of the four wheels, wherein the processing similar to those described hereinbefore may be performed for each of the wheels, substantially to the same effect.

Furthermore, when the torsion of the drive shaft is to be detected in the structure in which the differential mechanisms are interposed between the engine and the individual wheels as described hereinbefore in conjunction with the fifth embodiment, torque of a same magnitude acts on the two shafts disposed at the output side of the differential mechanism. Accordingly, the torque sensor may be provided at the shaft disposed at the input side of the differential mechanism to detect the torque appearing at the output of the engine. In other words, in the four-wheel driven motor vehicle, the output power of the engine is divided into front and rear driving wheel systems, respectively, and again divided into left and right driving wheels in both the front and rear systems. In that case, the torque sensor may be interposed between the engine and the differential mechanism for dividing the engine output power to the front and rear driving wheel systems for thereby determining the torsion torque applied to the four wheels.

Further, when the torsion torque is arithmetically determined by detecting the engine rotation number (rpm) as described hereinbefore in conjunction with the sixth embodiment in the four-wheel driven type motor vehicle equipped with the differential mechanisms for transmitting the engine torque to four driving wheels, the expression (15) mentioned hereinbefore can be used for determining the torsion torque while in the motor vehicle in which the differential mechanism is provided for dividing the engine output power into the front and rear driving wheel systems, the torsion torques of the front and rear wheels may be determined in accordance with the expression (13), substantially to the same effect as in the case of the first to fourth embodiments.

Further, the procedure for detecting the engine rotation number may be equally be applied for detecting the rotation speed (rpm) of the drive shaft 33.

As is apparent from the foregoing description, the judder-ascribable vibration of the wheels which takes place due to torsion applied to a drive shaft interposed between a prime mover and the driving wheels in the state where the driving wheels are operatively coupled to the prime mover can be discriminatively determined or identified on the basis of the vibration of the wheels and the vibrating state of the torsion torque applied to the driving shaft (inclusive of the axle shafts 4 and the drive shaft 33). In that case, when it is decided that the vibrating state of the wheel is not ascribable to the judder, then the vibration of the wheel may be regarded as being brought about by the rough-road condition. In this manner, the vibration of the wheel due to the judder and the vibration attributable to the rough-road condition can be discriminatively determined. Thus, in the anti-lock brake control system according to the invention, it is rendered unnecessary to estimate the frictional coefficient of the road surface, differing from the prior art anti-lock brake control system. By virtue of this features, the vibration ascribable to the judder and the vibration due to the rough-road condition can be discriminated speedily with high accuracy even in an early stage of the anti-lock brake control. Thus, according to the invention, the control performance of the anti-lock brake control system for the motor vehicle can be enhanced significantly.

Since the discriminative decision processing for the wheel vibration mentioned above can be performed for the driving wheels, the invention can be equally be applied to the four-wheel drive type motor vehicle in which all the wheels operate as the driving wheels.

Furthermore, owing to the arrangement that the rotation number or speed detecting means is employed for detecting the rotation number or speed of the prime mover or the driving shaft thereof, wherein the torsion torque is arithmetically determined on the basis of the detection value outputted from the rotation number detecting means, the anti-lock brake control system can be manufactured inexpensively when compared with the conventional anti-lock brake control system where the torque of the drive shaft is measured by using strain gauge.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, it is contemplated that storage or recording media on which the teachings of the invention are recorded in the form of programs executable by computers inclusive of microprocessor are to be covered by the invention.

Accordingly, all suitable modifications and equivalents may be resorted to, falling within the spirit and scope of the invention.

What is claimed is:

1. A method of determining discriminatively vibration of a driving wheel of a motor vehicle equipped with an engine and an anti-lock brake control system whether said vibration of the driving wheel is due to a judder phenomenon or brought about by rough-road condition, comprising the steps of:
   a) detecting a rotation speed of said driving wheel;
   b) detecting wheel vibration state on the basis of variation in said rotation speed of said driving wheel;
   c) detecting a torsion torque applied to a driving shaft serving as a torque transmitting member for coupling operatively said engine and said driving wheel to each other;
   d) detecting vibration state of said torsion torque; and
   e) deciding discriminatively whether the vibration of said driving wheel as detected is brought about: by said judder phenomenon or alternatively by said rough-road condition, on the basis of a relation between said wheel vibration state and said torsion torque vibration state.

2. A method according to claim 1,
said step b) including the substeps of:
   determining acceleration of said driving wheel on the basis of a rate of change in the wheel rotation speed; and
   measuring a wheel vibration period at which said wheel acceleration reaches a predetermined value; and
said step c) including the substep of:
   measuring a torsion torque vibration period at which the torsion torque reaches a predetermined value,
wherein in said step e), decision is made such that the wheel vibration is brought about by the rough-road condition when said wheel vibration period is greater than a predetermined value inclusive and when difference between said wheel vibration period and said torsion torque vibration period is greater than a predetermined value inclusive, while deciding that the wheel vibration is due to the judder phenomenon when said wheel vibration period is smaller than the first mentioned predetermined value and when said difference between said wheel vibration period and said torsion torque vibration period is smaller than the second mentioned predetermined value.

3. A method according to claim 2,
wherein in said substep of measuring said torsion torque vibration period, a time lapsed from a time point at which the wheel acceleration reached a predetermined value to a time point at which said torsion torque attains a predetermined value within a predetermined time period is measured, and
wherein in said step e), decision is made that the wheel vibration is ascribable to a rough-road condition when said torsion torque vibration period is greater than a predetermined value inclusive while deciding that the wheel vibration is due to a judder phenomenon when said time lapse is smaller than said predetermined value.

4. A method according to claim 1,
said step b) including the substeps of:
   determining a wheel acceleration by determining a rate of change of said wheel speed; and
   arithmetically determining a maximum value or alternatively a minimum value of said wheel acceleration as a wheel vibration amplitude value representing the amplitude of said wheel vibration;
said step d) including a substep of:
   arithmetically determining a maximum value or alternatively a minimum value of said torsion torque as a torque amplitude value representing the amplitude of said torque variation,
wherein in said step e), decision is made that the wheel vibration is ascribable to a rough-road condition when a ratio between said wheel acceleration amplitude value and the torsion torque amplitude value is greater than a predetermined value inclusive, while deciding that said wheel vibration is due to a judder phenomenon when the ratio between said wheel acceleration amplitude value and said torsion torque amplitude value is smaller than said predetermined value.

5. A method according to claim 1,
said step b) including the substeps of:
   determining a wheel acceleration by determining a rate of change of said wheel speed;
   measuring a wheel vibration period at which said wheel acceleration reaches a predetermined value;
   determining a corrected acceleration by correcting the wheel acceleration by adding thereto said torsion torque; and
   measuring a period at which said corrected acceleration reaches said predetermined value,
wherein in said step e), decision is made that the wheel vibration is due to a rough-road condition when said wheel vibration period is greater than a predetermined value inclusive and when the vibration period of said corrected acceleration is greater than a predetermined value inclusive, while deciding that the wheel vibration is ascribable to a judder phenomenon when said vibration period of said corrected acceleration is smaller than said predetermined value.

* * * * *